United States Patent
Uejo

(10) Patent No.: US 8,068,244 B2
(45) Date of Patent: Nov. 29, 2011

(54) DOCUMENT DISPOSAL MANAGEMENT SYSTEM, DOCUMENT DISPOSAL MANAGEMENT DEVICE, DOCUMENT DISPOSAL MANAGEMENT METHOD AND RECORDING MEDIUM STORING DOCUMENT DISPOSAL MANAGEMENT PROGRAM

(75) Inventor: Hiroyoshi Uejo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 896 days.

(21) Appl. No.: 12/104,113

(22) Filed: Apr. 16, 2008

(65) Prior Publication Data

US 2009/0070348 A1    Mar. 12, 2009

(30) Foreign Application Priority Data

Sep. 11, 2007  (JP) ................................ 2007-235318

(51) Int. Cl.
*G06K 15/00* (2006.01)
*G06F 3/12* (2006.01)

(52) U.S. Cl. ...................................... 358/1.14; 358/1.1

(58) Field of Classification Search .................... 358/1.1, 358/1.9, 1.13, 1.14, 1.15, 1.18, 537, 538, 358/448; 382/112, 149; 700/91, 217; 705/3, 705/28, 71; 707/602, 609, 636; 726/6, 18, 726/27

See application file for complete search history.

(56) References Cited

U.S. PATENT DOCUMENTS

| | | | | |
|---|---|---|---|---|
| 7,716,432 | B2 * | 5/2010 | Yoshiura et al. | 711/156 |
| 7,753,294 | B2 * | 7/2010 | Sugawara et al. | 241/36 |
| 7,843,579 | B2 * | 11/2010 | Shinozaki | 358/1.14 |
| 7,973,980 | B2 * | 7/2011 | Fukuda et al. | 358/474 |

FOREIGN PATENT DOCUMENTS

| | | |
|---|---|---|
| JP | A-11-110556 | 4/1999 |
| JP | A-11-339024 | 12/1999 |

* cited by examiner

*Primary Examiner* — Gabriel Garcia
(74) *Attorney, Agent, or Firm* — Oliff & Berridge, PLC

(57) ABSTRACT

A document disposal management system, which includes a print unit that performs combined printing of plural documents, each of the plural documents being embedded with document identification information and combination identification information; a management unit that manages comparison image data associated with the document identification information and a similarity value used as a threshold value; a determination unit that receives a request containing combined image data and pairs of document identification information and combination identification information, compares each of the combined image data with the comparison image data to calculate a similarity value, and determines approval/disapproval of disposal; a request unit that separates and extracts the combined image data and the pairs of document identification information and combination identification information from the scanned image output, and requests for determination; and a controller that performs control to dispose of or prohibit disposal based on the determination result.

11 Claims, 19 Drawing Sheets

FIG.5

DOCUMENT OPERATION HISTORY MANAGEMENT TABLE

| | DOCUMENT ID | USER ID | DATE AND TIME OF OPERATION | USED TERMINAL (IP ADDRESS) | TYPE OF OPERATION | SOURCE DOCUMENT | ...... |
|---|---|---|---|---|---|---|---|
| (A1) | docu00001 | 00001 | 2006. 9.10 10:11 | 123.456.789.011 | GENERATION | | |
| (A2) | docu00002 | 00001 | 2006. 9.10 10:18 | 123.456.789.011 | GENERATION | | |
| (A3) | docu00003 | 00001 | 2006. 9.10 10:20 | 123.456.789.011 | GENERATION | | |
| (A4) | docu00004 | 00001 | 2006. 9.10 10:31 | 123.456.789.011 | GENERATION | | |
| | .. | .. | .. | .. | .. | .. | |
| (B1) | docu10001 | 00001 | 2006. 9.11 9:50 | 123.456.789.311 | PRINT | docu00001 | |
| (B2) | docu10002 | 00001 | 2006. 9.11 10:24 | 123.456.789.312 | PRINT | docu00002 | |
| (B3) | docu10003 | 00001 | 2006. 9.11 10:26 | 123.456.789.311 | PRINT | docu00003 | |
| (B4) | docu10004 | 00001 | 2006. 9.11 10:44 | 123.456.789.312 | PRINT | docu00004 | |
| | .. | .. | .. | | .. | .. | |
| (C1) | docu20001 | 00001 | 2006. 9.11 11:15 | 123.456.789.311 | 4-up COPY | docu10001<br>docu10002<br>docu10003<br>docu10004 | |
| | ... | ... | ... | ... | ... | ... | |
| (D1) | docu20001 | 00001 | 2006. 9.15 10:15 | 123.456.789.711 | DISPOSAL | | |

| DOCUMENT OPERATION AUTHORITY MANAGEMENT TABLE |||||||||||||||
| DOCUMENT ID | DOCUMENT OPERATION AUTHORITY ||||||||||||| ...... |
| | VIEW ||| PRINT ||| SCAN ||| COPY ||| DISPOSAL ||| |
| | SECURITY LEVEL ||| SECURITY LEVEL ||| SECURITY LEVEL ||| SECURITY LEVEL ||| SECURITY LEVEL ||| |
| | a | b | c | a | b | c | a | b | c | a | b | c | a | b | c | ...... |
| docu00001 | 1 | 1 | 1 | 1 | 1 |   | 1 | 1 |   | 1 | 1 |   | 1 | 1 | 1 | ......... |
| docu00002 | 1 | 1 | 1 | 1 | 1 |   | 1 | 1 |   | 1 | 1 |   | 1 | 1 | 1 | ......... |
| ......... | ......... |||||||||||||| ......... |

FIG.7

DOCUMENT DISPOSAL MANAGEMENT SYSTEM, DOCUMENT DISPOSAL MANAGEMENT DEVICE, DOCUMENT DISPOSAL MANAGEMENT METHOD AND RECORDING MEDIUM STORING DOCUMENT DISPOSAL MANAGEMENT PROGRAM

CROSS-REFERENCE TO RELATED APPLICATION

This application is based on and claims priority under 35 USC 119 from Japanese Patent Application No. 2007-235318 filed on Sep. 11, 2007.

BACKGROUND

1. Technical Field

The present invention relates to a document disposal management system, a document disposal management device, a document disposal management method and a recoding medium storing a document disposal management program.

2. Related Art

It is a common practice in system environment, for example, established in offices or the like by network connection among client PCs, printers, multifunctional devices, and document management servers, to hold and manage operation history of various operations including printing of electronic documents on a recording medium (paper), scanning and copying of documents printed on paper, and transfer of documents for the purpose of enhancing the security of the documents.

Nowadays, in particular, from the viewpoint of information security focusing on the e-document bill and ISO15489, there has arisen a demand for an even higher level of history management on when and who performed what operation to which document.

Document operations managed in such document operation history management naturally includes disposal of documents.

SUMMARY

An aspect of the present invention provides a document disposal management system, which includes an image formation device; a document management device; and a document disposal device, in which: the image formation device includes: a print unit that performs combined printing of plural documents as a paper document in which pieces of combined image data of the documents enlarged or reduced according to a designated paper size and the number of combination are arranged respectively to N-divided regions where each of the regions is indicated by combination identification information of n/N (n is an integer of one or greater), and each of the plural documents is embedded with document identification information and the combination identification information; the document management device includes: a management unit that manages, in association with the document identification information, comparison image data obtained by enlarging or reducing image data of a relevant document according to a prescribed paper size and the number of combination, and a similarity value used as a threshold value for determining approval or disapproval of disposal of a paper document; and a determination unit that receives from the document disposal device a document disposal approval/ disapproval determination request containing an arbitrary number of pieces of combined image data and pairs of document identification information and combination identification information, compares each of the pieces of the combined image data with the comparison image data by using each of the document identification information as a key to calculate a similarity value, and determines whether disposal of the document is to be approved or not according to whether all of the calculated similarity values exceed the relevant threshold value and the number of pieces of the combined image data satisfies the number of combination indicated by the combination identification information; and the document disposal device includes: a document disposal approval/ disapproval determination request unit that separates and extracts the combined image data and the pairs of document identification information and combination identification information from the image output obtained by scanning the paper document to be disposed oft and requests the document management device for document disposal approval/disapproval determination by using an arbitrary number of pieces of the extracted combined image data and an arbitrary number of the extracted pairs of document identification information and combination identification information; and a document disposal approval/disapproval controller that performs document disposal approval/disapproval control to dispose of or prohibit disposal of the paper document to be disposed of based on the determination result made by the determination unit in response to the document disposal approval/disapproval determination request.

BRIEF DESCRIPTION OF THE DRAWINGS

Exemplary embodiment of the present invention will be described in detail based on the following figures, wherein:

FIG. 5 is a table diagram showing an example of document operation history information registered in a document operation history management table;

FIG. 7 is a table diagram showing an example of information registered in a document operation authority information management table;

FIGS. 19A and 19B are diagrams showing examples of structure of paper documents to be disposed of.

DETAILED DESCRIPTION

Exemplary embodiment of the present invention will be described in detail with reference to the accompanying drawings.

Figure 1:
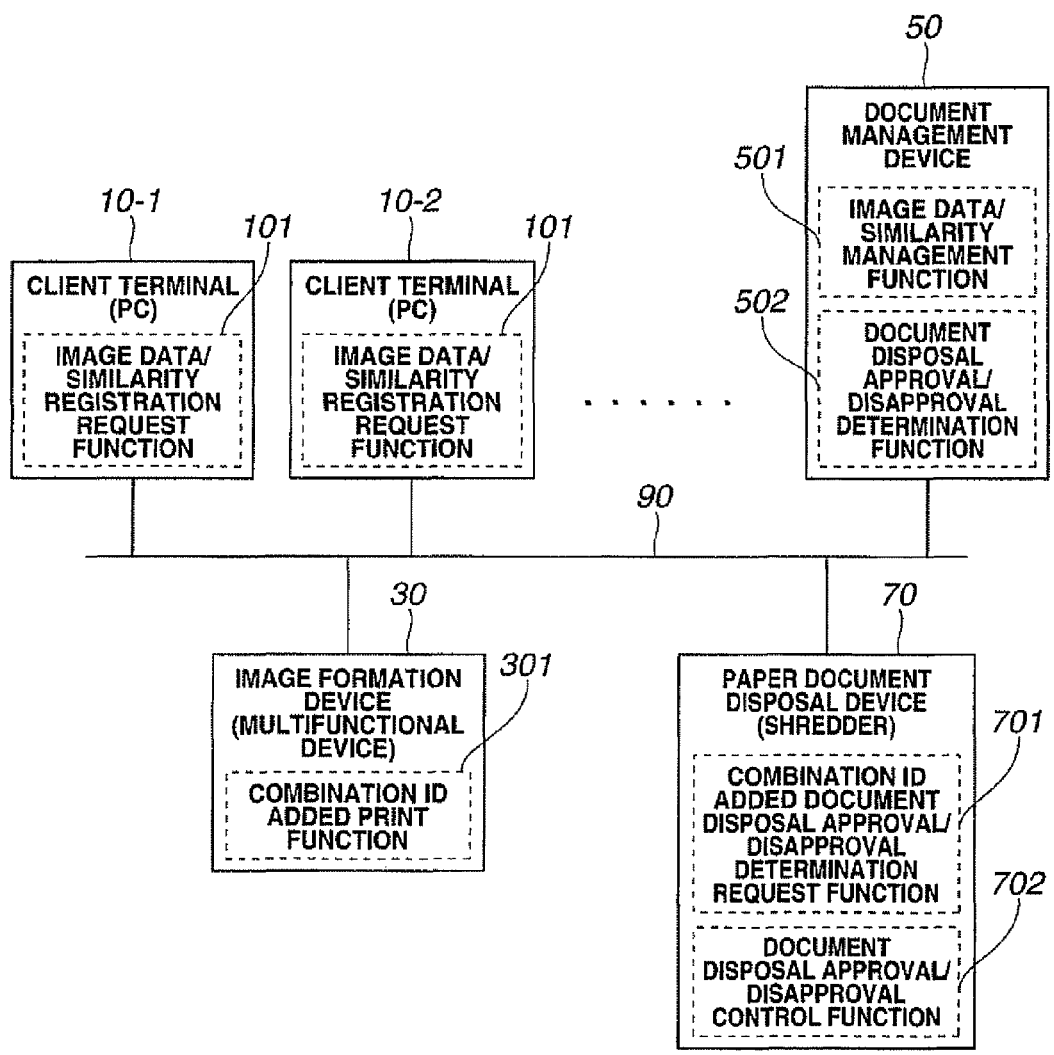
FIG. 1 is a block diagram showing overall configuration of a document disposal management system according to the present invention.

FIG. 1 is a block diagram showing overall configuration of a document disposal management system according to the present invention.

This system is configured by communicably connecting plural client terminals 10 (10-1, 10-2, . . . ), an image formation device 30, a document management device 50, and a document disposal device 70 by way of a network (NW) 90 such as LAN (Local Area Network) or WAN (Wide Area Network).

Each of the devices, as shown in FIGS. 2 to 4 and FIG. 8, includes a CPU (Central Processing Unit), a ROM (Read Only Memory) or RAM (Random Access Memory) as a main memory unit, a hard disk as a peripheral memory unit, an input interface, a communication interface, and so on.

In the system configuration shown in FIG. 1, the image formation device 30, the document management device 50, and the document disposal device 70 also may be provided in plurality.

Figure 2:
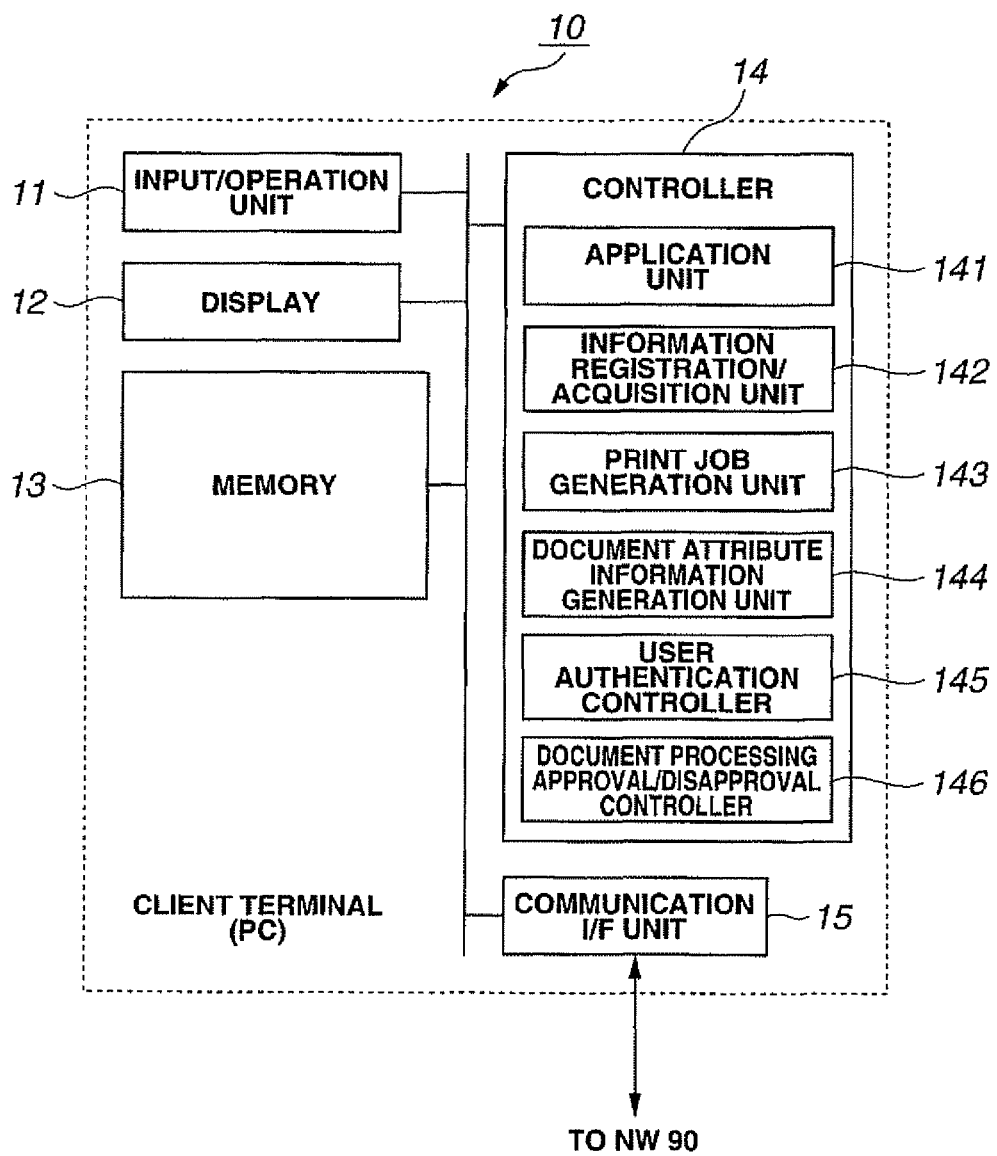
FIG. 2 is a block diagram showing functional configuration of the client terminal in FIG. 1.

FIG. 2 is a block diagram showing functional configuration of the client terminal 10 shown in FIG. 1.

The client terminal 10 is embodied by a general purpose computer such as a PC (personal computer). As shown in FIG. 2, the client terminal 10 includes an input/operation unit 11 formed by input devices such as a keyboard and a mouse, a display 12 for displaying various information such as operation guidance and operational state, a memory 13 for storing various information such as an operating program, a controller 14 for controlling the entire device, an image formation device 30, and a communication interface (I/F) unit 15 serving as a communication interface when communication is made with the document management device 50 or the like through the NW 90

The controller 14 includes: an application unit 141 for performing various operations [e.g. generation, storage (registration), display (viewing), editing, and print instruction] on document files (electronic document data, hereafter referred as the "electronic documents") according to a predetermined operation on the input/operation unit 11; an information registration/acquisition unit 142 for performing information registration processing of registering, in the document management device 50, information such as electronic documents, document operation authority information, and meta-information relating to operation on the documents, and information acquisition processing of acquiring information such as electronic documents and document operation authority information from the document management device 50; a print job generation unit 143 for generating a print job of an electronic document to be printed according to a predetermined print instruction operation on the input/operation unit 11 and transmitting the same to the image formation device 30; a document attribute information generation unit 144 which, when the information registration/acquisition unit 142 registers meta-information according to the above-described various operations performed on a document, generates document attribute information including document identification information (document ID) to identify that the document is derived as a result of the operation; a user authentication controller 145 which, when an operation is performed on an electronic document, controls user authentication in cooperation with the user attribute information management function of the document management device 50; and a document processing approval/disapproval controller 146 which, when an operation is performed on an electronic document, performs document processing approval/disapproval control on whether the processing of the document is executed or prohibited based on the document operation authority information acquired by the information registration/acquisition unit 142 from the document operation authority (policy) management function of the document management device 50.

Figure 3:
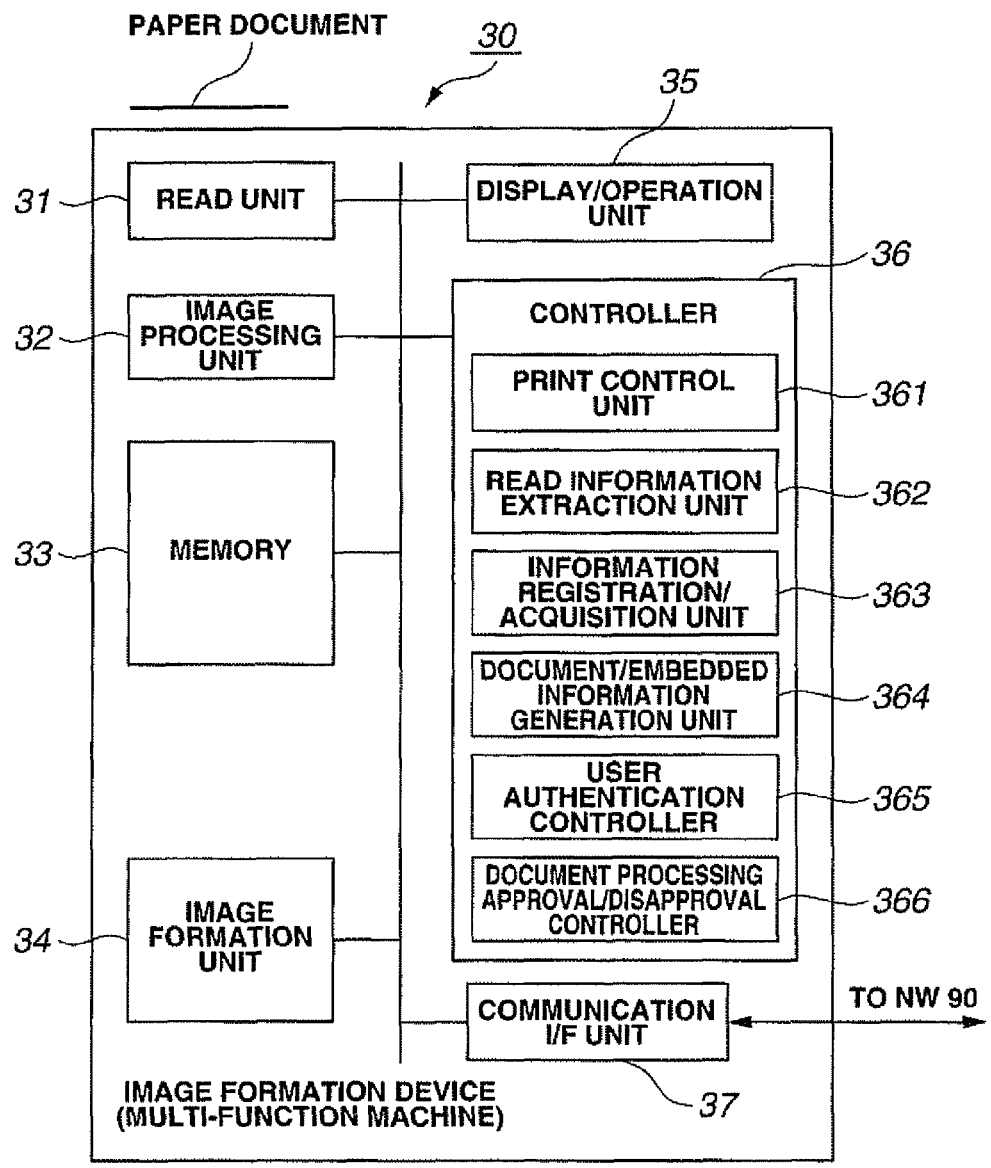
FIG. 3 is a block diagram showing functional configuration of the image formation device in FIG. 1.

FIG. 3 is a block diagram showing functional configuration of the image formation device 30 shown in FIG. 1.

This image formation device 30 is for example a multifunctional device having plural functions such as reading (scanning), copying, printing, and facsimile communication. As shown in FIG. 3, the image formation device 30 includes: a read unit (scanner unit) 31 for scanning an image of an original document (paper document) set on a platen and converting it to an electronic image signal (image data); an image processing unit 32 for performing image processing to generate print data from the scanned data obtained by the read unit 31 scanning the paper document or a print job forwarded from the client terminal 10; a memory 33 for storing various information such as scanned data and an operating program; an image formation unit 34 for executing an electrophotography process based on the print data generated by the image processing unit 32 to form an image corresponding to the print data on a recording medium (recording paper); a display/operation unit 35 formed for example by a large-size bit map display having a touch panel function; a controller 36 for performing control on the entire device, such as operation control of respective units relating to the scanning, copying, printing and facsimile functions; and a communication interface (I/F) unit 37 serving as a communication interface when the image formation device 30 communicates with the client terminal 10, the document management device 50, the document disposal device 70 or the like through the NW 90.

The controller 36 has a print controller 361, a read information extraction unit 362, an information registration/acquisition unit 363, a document/embedded information generation unit 364, a user authentication controller 365, and a document processing approval/disapproval controller 366.

The print controller 361 performs print control such that the image processing unit 32 generates print data based on a print job received from the client terminal 10 via the communication I/F unit 37, or scanned data obtained by scanning a paper document by the read unit 31, and the image formation unit 34 fonts (prints) an image on recording paper based on the print data and outputs the same as a paper document.

The read information extraction unit 362 performs processing of separating and extracting, from the scanned data, document data of the paper document to be read and additional data [embedded information such as document ID and combination identification information (combination ID) to be described later] to be added to the document data.

The information registration/acquisition unit 363 performs, when an operation is performed to scan or copy a paper document, information registration processing to generate document attribute information including a document ID or the like for identifying that the document is derived from that operation, and to register the document attribute information together with meta-information relating to that operation. The information registration/acquisition unit 363 also performs document acquisition processing to acquire, from the document management device 50, document operation authority information corresponding to the additional data extracted by the read information extraction unit 362.

The document/embedded information generation unit 364 performs processing to generate an electronic file to be held as scanned data based on the document data extracted from the scanned data. When the document operation is multiple-page combined printing such as N-up printing or copying, or duplex printing, the document/embedded information generation unit 364 also performs processing to generate embedded information [e.g., combination ID (N-up ID indicating a sequential number assigned to each of N original documents to be combined in N-up print)] which is printed on a paper document while being embedded in the document data extracted from the scanned data.

When scanning or copying a paper document, the user authentication controller 365 acquires from a user a user ID or password for identifying the user and controls user authentication based on the user ID or password in cooperation with the document management device 20.

After completion of the user authentication by the user authentication controller 365, the document processing approval/disapproval controller 366 cooperates with the document management device 50 to acquire from the document management device 50 operation authority relating to document processing (scanning, copying, and facsimile transmission) for a paper document based on, for example, additional data (document ID) extracted from scanned data obtained by scanning the paper document image by the read unit 31 and the user ID acquired from the user during the user authentication, and to perform document processing approval/disapproval control to determine whether the document processing (scanning, copying, and facsimile transmission) is to be executed or prohibited based on the operation authority thus acquired.

Figure 4:
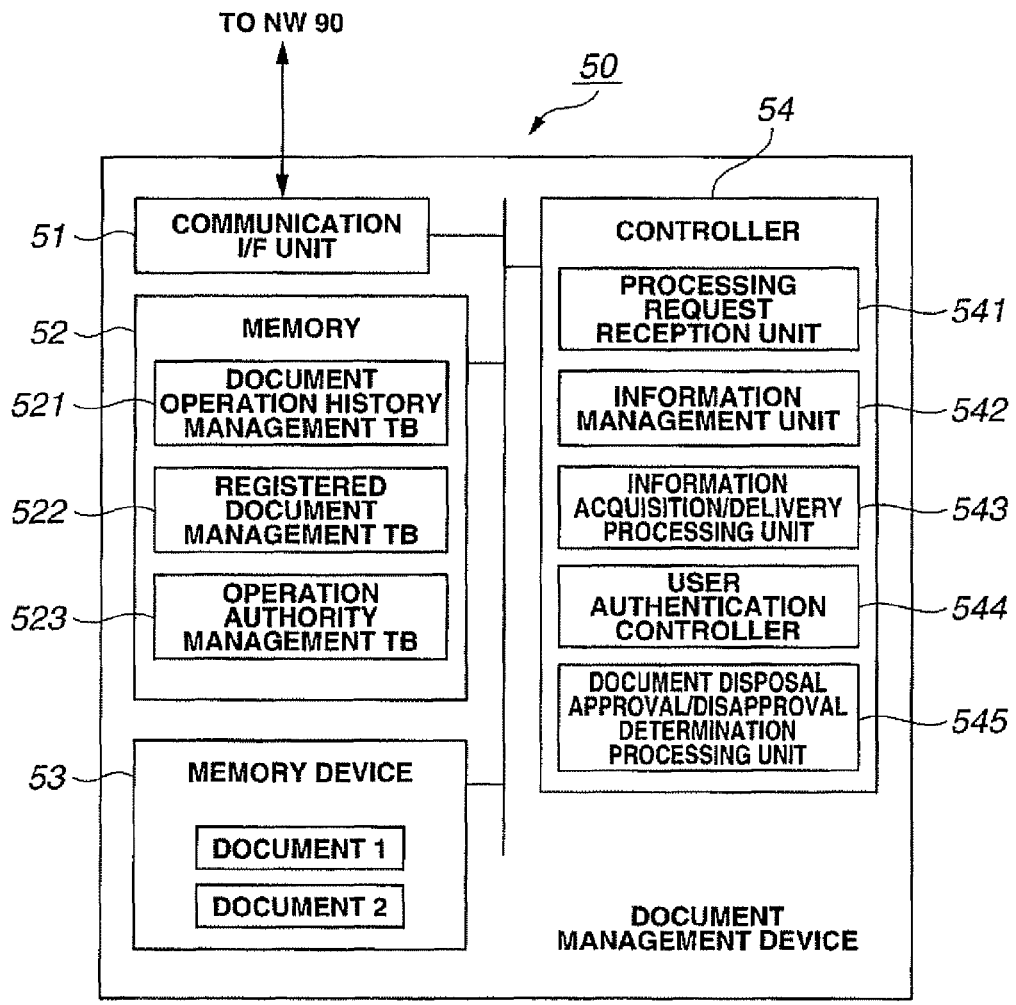
FIG. 4 is a block diagram showing functional configuration of the document management device in FIG. 1.

FIG. 4 is a block diagram showing functional configuration of the document management device 50 shown in FIG. 1.

The document management device 50 is formed by a general purpose computer and includes, as shown in FIG. 4, a communication interface (I/F) unit 51 serving as a communication interface when the document management device 50 communicates with the client terminal 10, the image formation device 30, the document disposal device 70 or the like via the NW 90, a memory unit 52 for storing various information such as an operating program, a memory device 53 formed for example by a hard disk drive (HDD) for storing information such as electronic documents requested to register by the client terminal 10, and a controller 54 for controlling the entire device.

The controller 54 includes: a processing request reception unit 541 which receives a request for registration or acquisition of various information from the client terminal 10, the image formation device 30 or the like and gives instructions to an information management unit 542 or information acquisition/delivery processing unit 543 to be described later to execute the requested registration or retrieval of the information; an information management unit 542 which registers the requested information (an electronic document, document operation authority information, or meta information relating to operation of the electronic document or paper document) in the memory unit 52 or memory device 53 based on the information registration instructions from the processing request reception unit 541 and manages the registered information; an information acquisition/delivery processing unit 543 which retrieves, from the memory unit 52 or the memory device 53, the information (document operation authority information, user authentication information or the like) requested for acquisition based on the information search instructions from the processing request reception unit 541 and delivers the retrieved information to the device originating the request; a user authentication controller 544 which performs user authentication control based on a user ID input by a user when the user uses the image formation device 30; and a document disposal approval/disapproval determination processing unit 545 which cooperates with the document disposal device 70 to determine whether the disposal of a paper document placed for disposal in the document disposal device 70 is permitted or prohibited.

The memory unit 52 is provided with a document operation history management table (TB) 521, a registered document management table (TB) 522, and an operation authority management table (TB) 523.

The information management unit 542 manages various information with the use of these tables 521, 522 and 523.

In one example, in response to a registration request for a document ID and meta data of an electronic document transmitted by the information registration/acquisition unit 142 when any of various operation is conducted on the electronic document by the client terminal 10 (see S108a in FIG. 9), or a registration request for a document ID and meta data of a paper document transmitted by the information registration/acquisition unit 363 when scanning or copying operation is conducted on the paper document by the image formation device 30 (see S126a in FIG. 10), the information management unit 542 holds and manages the document ID and the meta data requested for registration as document operation history information in the document operation history management table (TB) 521 while associating them with each other.

FIG. 5 is a table diagram showing an example of document operation history information registered in the document operation history management table 521 of the document management device 50.

As shown in FIG. 5, there is registered, in the document operation history management table 521, operation history information consisting of document ID, user ID, date and time of operation, used terminal (IP address), type of operation, source document, and other information items.

In the information registered in the document operation history management table 521, the information items in the row indicated by the reference symbol A1 are document operation history information that was registered when a user with a user ID of 00001 generated an electronic document with a document ID of docu00001 at 10:11 on Sep. 10, 2006 by using a client terminal 10 with an IP address of 123.456.789.011.

Similarly, the information items in the rows indicated by the reference symbols A2, A3 and A4 are document operation history information registered when the same user as the above generates electronic documents with document IDs of docu00002, docu00003, and docu00004 by using the same client terminal 10.

The information items in the row indicated by the reference symbol B1 are document operation history information registered when a user with a user ID of 00001 printed an electronic document with a document ID of docu10001 by using an image formation device 30 with an IP address of 123.456.789.311 at 9:50 on Sep. 11, 2006.

Similarly, the information items in the rows indicated by the reference symbols B2, B3 and B4 are document operation history information when a user with a user ID of 00001 printed electronic documents with document IDs of docu10002, docu10003, and docu10004 by using an image formation device 30 with an IP address of 123.456.789.311 or an image formation device 30 with an IP address of 23.456.789.312.

The information items in the row indicated by the reference symbol C1 are document operation history information registered when a user with a user ID of 00001 copied four paper documents with document IDs of docu10001, docu10002, docu10003, and docu10004 in 4-up format while assigning a document ID of docu20001 to the 4-up copy by using an image formation device 30 with an IP address of 123.456.789.311 at 11:15 on Sep. 11, 2006.

Further, the information items in the row indicated by the reference symbol D1 are document operation history information registered when a user with a user ID of 00001 disposed of a paper document (4-up copy) with a document ID of docu20001 by using a document disposal device 70 with an IP address of 123.456.789.711 at 10:15 on Sep. 15, 2006.

When an electronic document is generated by the client terminal 10, a document registration request is transmitted by the information registration/acquisition unit 142 prior to a registration request of meta data relating to the generation of the electronic document, (see S107*a* in FIG. 9), whereas, when a paper document is scanned by the image formation device 30, a registration request of the electronic document (corresponding to the scanned data) is transmitted by the information registration/acquisition unit 363 prior to a registration request of meta data relating to the scanning of the paper document. The information management unit 542 stores the electronic document requested for registration in free space in a database (DB) provided in the memory device 53, for example, based on such registration request, and holds and manages the same in association with the storage location and the document ID contained in the relevant registration request in a registered document management table (TB) 522 provided in the memory unit 52.

According to the present invention, the document registration request transmitted by the information registration/acquisition unit 142 when an electronic document is generated by the client terminal 10 contains not only the electronic document to be registered and a document ID thereof but also other information such as image data and similarity of the electronic document. Based on this document registration request, the information management unit 542 registers and manages, on the registered document management table 522, not only the electronic document and storage location of its image data but also similarity thereof in association with the document ID.

Figure 6:
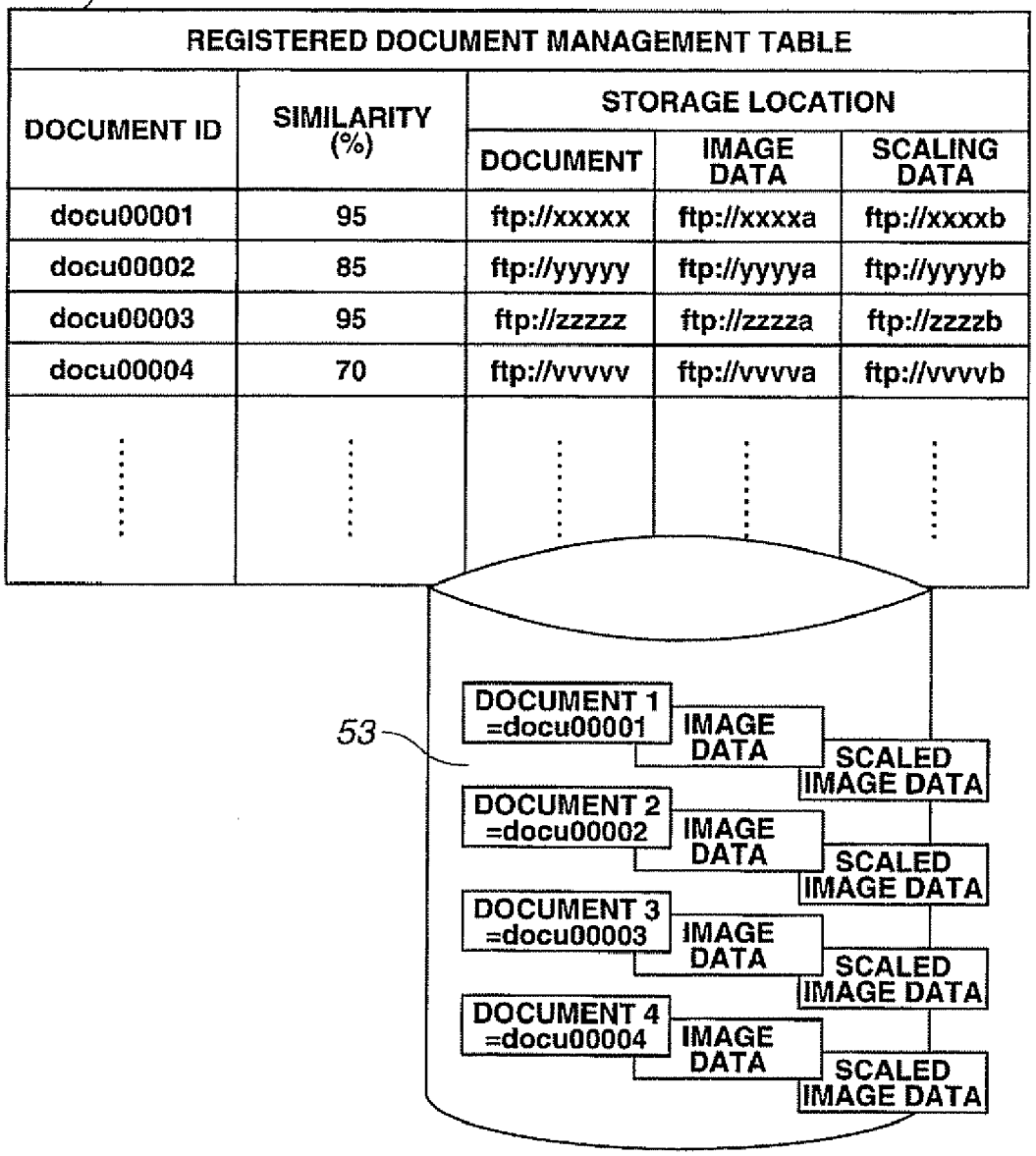
FIG. 6 is a conceptual diagram showing an example of a mode of managing information in a memory device and a registered document management table.

FIG. 6 is a conceptual diagram showing an example of an information management mode using the memory device 53 and the registered document management table 522 in the document management device 50.

According to the example shown in FIG. 6, when receiving, for example, a registration request containing an electronic document 1, its document ID of docu00001, image data and a similarity value of 95% from the client terminal 10, the information management unit 542 stores the electronic document 1 at ftp://xxxxx in the memory device 53 and the image data at ftp://xxxxa in the memory device 53, while registering the respective storage locations ftp://xxxxx and ftp://xxxxa of the electronic document 1 and its image data and the similarity value of 95% in the registered document management table 522 in association with the document ID docu00001 of the electronic document 1.

Similarly, when receiving, from the client terminal 10, a registration request containing electronic documents 2, 3 and 4, their document IDs of docu00002, docu00003 and docu00004, image data and similarity values of 85%, 95% and 70%, the information management unit 542 registers the electronic documents 2, 3 and 4, their image data, and respective storage locations thereof, ftp://yyyyy, ftp://yyyya, ftp://zzzzz, ftp://zzzza, ftp://vvvvv and ftp://vvvva, and similarity values of 85%, 95% and 70% in the registered document management table 522 in association with the document JDs of docu00002, docu00003 and docu00004 of the electronic documents 2, 3 and 4.

The similarity is a value according to a security level, and is set to a greater value as the security level becomes higher.

Figure 13:
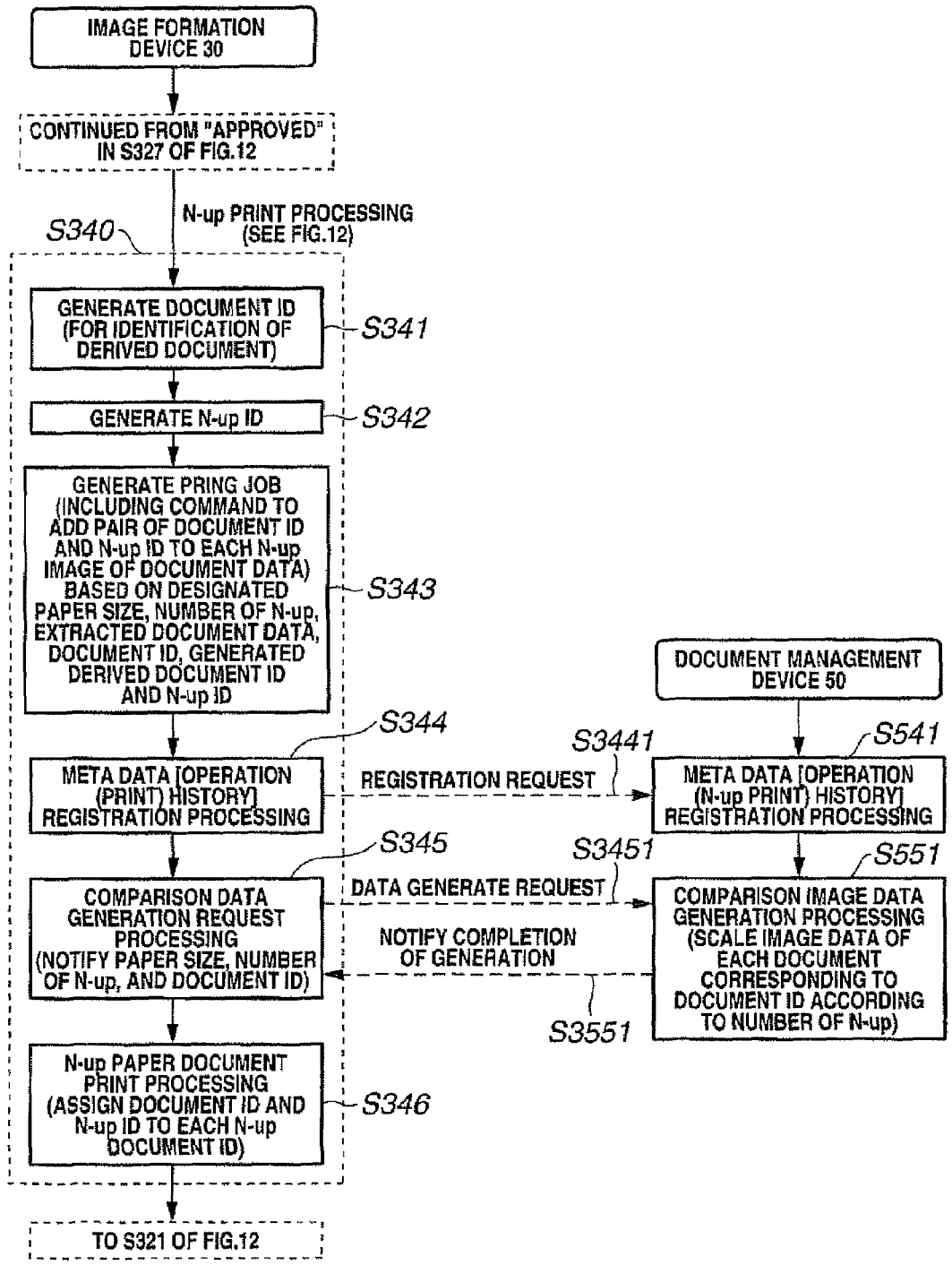
FIG. 13 is a diagram showing control sequence relating to N-up copy processing.

When the electronic documents 1, 2, 3 and 4 managed in association with the document IDs on the registered document management table 52 are printed by the image formation device 30 as paper documents 41, 42, 43 and 44 with the respective document IDs embedded therein (see FIGS. 11A to 11D), and then the paper documents 41, 42, 43 and 44 are copied in 4-up format, the information management unit 542 acquires the document IDs, a paper size and the number of combination (value of N=4) at that time from the image formation device 30 (see S3451 in FIG. 13). The information management unit 542 then generates scaled image data by enlarging or reducing (scaling) the original image data registered in association with the document IDs according to the acquired paper size and value of N and stores the same in the memory device 53 (see S551 in FIG. 13). At the same time, the storage locations of the scaled image data, namely ftp://xxxxb, ftp://yyyyb, ftp://zzzzb, and ftp://vvvvb are additionally registered in the registered document management table 522 in association with the respective document IDs.

Further, in the generation and registration of the document described above, the information management unit 542 receives operation authority information relating to the document from the client terminal 10 following the registration of the document meta data (see S110*a* in FIG. 9), sets the received operation authority information in the operation authority information management table 523 in association with the document ID of the document (see S503 in FIG. 9), and manages the same.

FIG. 7 is a table diagram showing an example of information registered in the document operation authority information management table 523 in the document management device 50.

According to this example of the document operation authority information management table 523, operation approval/disapproval conditions (for example, the presence of flag "1" indicates approval of operation, whereas the absence of the flag "1" indicates prohibition of operation) are set for each type of document operation such as viewing, printing, scanning, copying, and disposal for each security level in association with the document ID of the generated electronic document.

The security levels a, b and c as used herein may be defined, for example, in association with job titles such as employee, manager and director.

On the other hand, the information management unit 542 holds and manages user attribute information indicating the user's job title (security level) by using a user attribute information management table (not shown) provided in the memory unit 52.

Thus, a user ID of a user who utilizes the client terminal 10 or the image formation device 30 is retrieved to specify the security level (job title) corresponding to the user ID by referring to the user attribute information, and the operation approval/disapproval conditions for the security level applied to the document operation is specified from the operation authority information management table 523, whereby the operation approval/disapproval control can be conducted with respect to the document.

Figure 8:
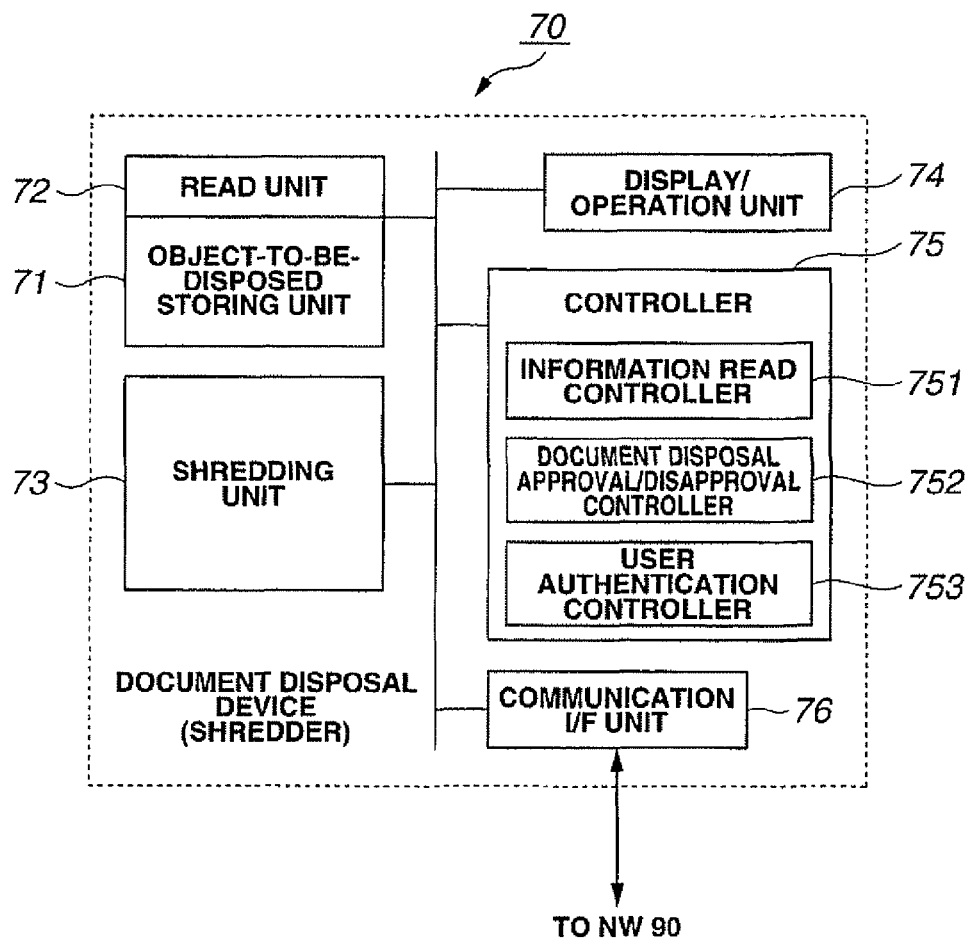
FIG. 8 is a block diagram showing functional configuration of the document disposal device in FIG. 1.

FIG. 8 is a block diagram showing functional configuration of the document disposal device 70 shown in FIG. 1.

The document disposal device 70 includes: an object-for-disposal storing unit 71 in which objects for disposal such as paper documents are placed; a read unit 72 which scans an image of a paper document placed for disposal in the object-for-disposal storing unit 71 and converts it to an electronic image signal (image data); a shredder unit 73 which has a gate controllable to be opened and closed, and takes in a paper document from the object-for-disposal storing unit 71 through the opened gate to shred the same; a display/operation unit 74 which is formed for example by a bit map display with a touch panel function; a controller 75 which has a memory unit storing various information such as an operating program and controls the entire device based on the operating program; and a communication interface (I/F) unit 76 serving as a communication interface when communication is made with the document management device 50 or the like through the NW 90.

The controller 75 includes an information read controller 751, a document disposal approval/disapproval controller 752, and a user authentication controller 753.

The information read controller 751 drives the read unit 72 to control the reading (scanning) of the image of a paper document for disposal when the paper document for disposal is placed in the object-for-disposal storing unit 71 and the display/operation unit 74 starts a document disposal operation.

The document disposal approval/disapproval controller 752 performs document disposal approval/disapproval control, based on the image data read by the read unit 72 from the paper document placed for disposal in the unit 71, to determine in cooperation with the document management device 50 whether the paper document is to be disposed or prohibited from being disposed of.

The user authentication controller 753 acquires the user ID and password from the user prior to accepting a document disposal start operation, and performs user authentication control based on the acquired user ID and password in cooperation with the document management device 50.

According to the system configured as described above, the user is allowed to perform operation to generate, register, view, edit, and disposed of electronic documents with the use of the client terminal 10. The user is also allowed to print paper documents with the use of the image formation device 30. Further, the user is allowed to perform operation to scan or copy the paper documents with the use of the image formation device 30. Still further, the user is allowed to dispose of the paper documents with the use of the document disposal device 70.

This system operates on the basis that management of the document operation history in the document life cycle consisting of conversion from an electronic document to a paper document, conversion from the paper document to the electronic document, and disposal of the paper document can be performed by using the document operation history management table 521 (see FIG. 5). Thus, even if a multiple-page combined printing (N-up copying or duplex copying) operation is performed for deriving a single paper document from plural paper documents having document IDs embedded therein, the system enables the document disposal device 70 to perform disposal control on the derived document (the paper document obtained as a result of the N-up copying or duplex printing) by tracing the source documents thereof.

In order to implement the disposal control on a multiple-page combined printed paper document, the devices in the system according to the present invention have respective processing functions indicated by the reference numerals 101, 301, 501, 502, 701, and 702 in the system configuration shown in FIG. 1.

For example, the client terminal 10 has an image data/similarity registration request function 101 in which the information registration/acquisition unit 142 generates an document ID and image data of an electronic document when the electronic document is registered in the document management device 50, while also accepting a similarity setting operation, and requests to the document management device 50 registration of the electronic document, its image data and similarity in association with the document ID.

Figure 18:
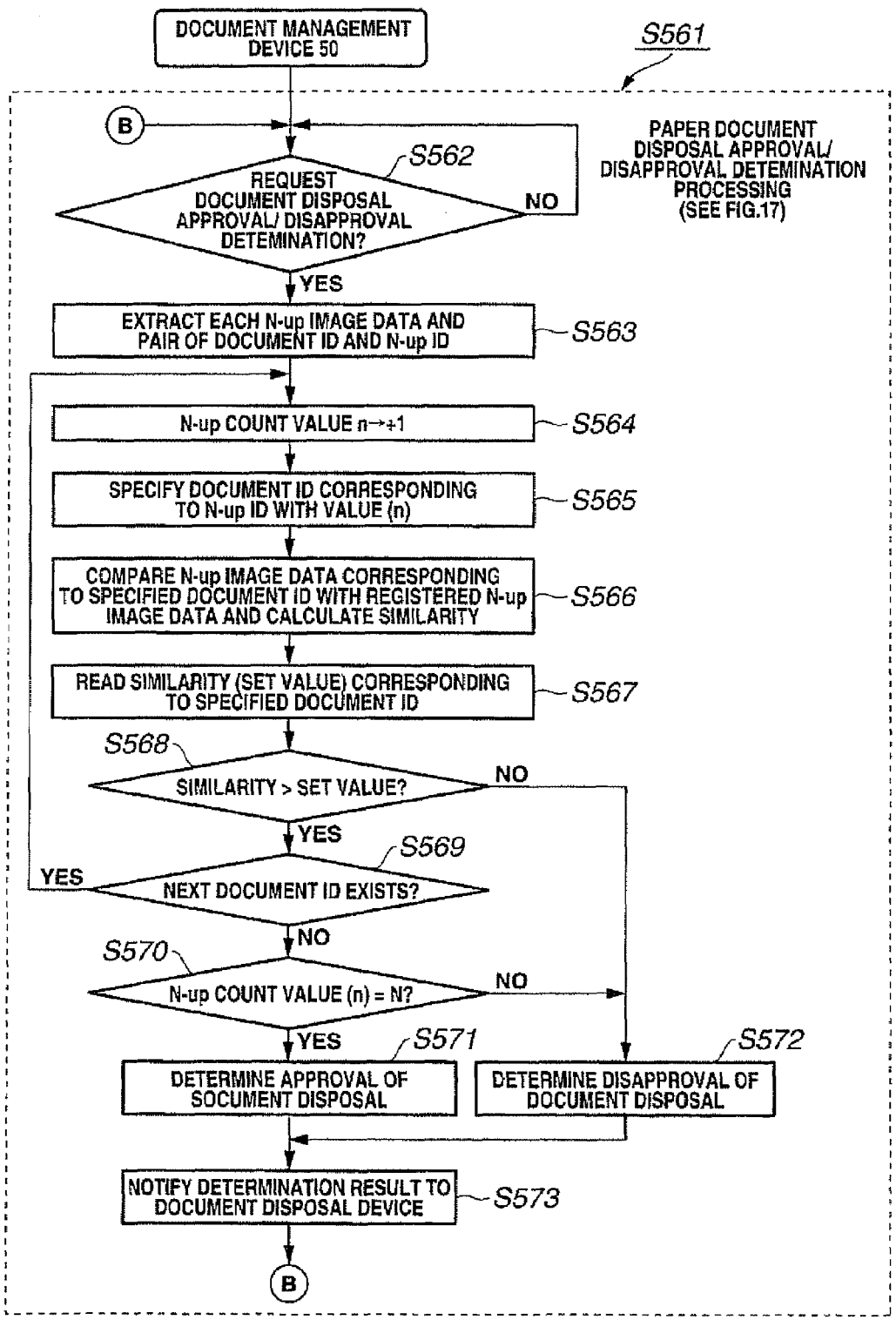
FIG. 18 is a flowchart showing paper document disposal approval/disapproval determination processing in step S561 of FIG. 17.

The similarity requested for registration here is used as a threshold value by the document management device 50 when determining whether a paper document is to be disposed of or not in document disposal approval/disapproval determination processing to be described later (FIG. 18). More specifically, the document management device 50 receives, from the document disposal device 70, a document disposal approval/disapproval determination request containing an arbitrary number of pieces of combined image data read from paper documents placed for disposal in the document disposal device 70 as objects for disposal and an arbitrary number of pairs of document ID and combination ID, compares the combined image data with the comparison image data using the document IDs as keys to compute respective similarity values, and determines whether the paper document is to be disposed of or not depending on whether the computed similarity values exceed the threshold value.

In the image formation device 30, the print controller 361 has a function to print out an electronic document, which is instructed to print by the client terminal 10, as a paper document with its document ID embedded therein, and additionally has a combination ID added print function 301 in which, when plural paper documents with their document IDs embedded are combined and printed as a single paper document (N-up copying or the like), combined image data of each document to be printed (source document) (image data of each document scaled according a designated paper size and the number of combination) is arranged in each of N regions obtained by dividing an image forming region and indicated by the corresponding combination ID=n/N (n is an integer of one or more, and N=2, 4, 6, . . . ), and multiple-page combined printing is performed to print a paper document with each document being embedded with its document ID and combination ID.

In the document management device 50, the information management unit 542 has a image data/similarity management function 501 in which, according to the registration request made by the image data/similarity registration request function 101 of the client terminal 10, an electronic document corresponding to the document ID, its image data (comparison image data obtained by scaling the image data of the relevant document according to a predetermined paper size and the number of combination) and a similarity value are registered and managed by using the registered document management table 522. Further, when plural paper documents having document IDs embedded therein are printed out in combination on a single sheet of paper by the image formation device 30, the image data/similarity management function 501 acquires information on the document IDs of the paper documents, the paper size and the number of combination from the image formation device 30 to generate the above-mentioned comparison image data by scaling the image data of the document corresponding to the document ID based on the paper size and the number of combination, and holds and manages the same.

In the document management device 50, the document disposal approval/disapproval determination processing unit 545 has a document disposal approval/disapproval determination function 502 in which the document disposal approval/disapproval determination processing unit 545 receives, from the document disposal device 70, a document disposal approval/disapproval determination request containing an arbitrary number of pieces combined image data read from paper documents for disposal and an arbitrary number of pairs of document ID and combination ID, and computes a similarity value by comparing the combined image data with the comparison image data for each of the document IDs by using the document IDs as a key. Further, the document disposal approval/disapproval determination processing unit 545 determines whether the disposal of the document is permitted or not according to whether or not all the computed similarity values exceed the corresponding set values (threshold values) and the combined image data contains all the combined documents (satisfies the value of N) indicated by the combination ID, and transmits the determination result the document disposal device 70.

In the document disposal device 70, the document disposal approval/disapproval controller 752 has a combination ID added document disposal approval/disapproval determination request function 701 in which combined image data and a pair of document ID and combination ID are extracted from read image output obtained by reading and scanning a paper document obtained by multiple-page combined printing (for example, output result of N-up copying), and transmits a document disposal approval/disapproval determination request containing an arbitrary number of pieces of the combined image data and an arbitrary number of pairs of document ID and combination ID to the document management device 50. The document disposal approval/disapproval controller 752 also has a document disposal approval/disapproval control function 702 in which the document disposal approval/disapproval controller 752 receives the determination result transmitted in response to the document disposal determination request by the document disposal approval/disapproval determination function 502 of the document management device 50, and if the determination result is approval of disposal, the document disposal approval/disapproval controller 752 opens the gate of the shredder unit 73 so that the paper document is received in and disposes of by the shredder unit 73, whereas if the determination result is disapproval, the disposal of the paper document is prohibited with the gate being kept closed.

In the system of the present invention formed by communicably connecting the devices (see FIG. 1) and having the functional configuration as described above, upon receiving a multiple-page combined print command to print plural documents with a paper size and the number of combination to be combined N being designated, the combination ID added print function 301 of the image formation device 30 arranges combined image data of each document scaled according to the paper size and the quantity of combined pages in the corresponding one of the N regions obtained by dividing the image forming region, and prints a paper document while each document is embedded with the document ID and the combination ID (combination ID added document). When the paper document (combination ID added document) is then placed for disposal in the document disposal device 70 and a document disposal start operation is performed, the combination ID added document disposal approval/disapproval determination request function 701 reads the combined image on the paper document together with the pairs of document ID and combination ID, and transmits to the document management device 50 a document disposal determination request containing an arbitrary number of pieces of the combined image data and an arbitrary number of pairs of document ID and combination ID thus read. In response to the document disposal determination request, the document disposal approval/disapproval determination function 502 of the document management device 50 compares the combined image data with the comparison image data by using the document ID as a key to compute a similarity value for each document ID. When all the computed similarity values exceed corresponding threshold values and the combined image data contains all the combined documents indicated by the combination ID (satisfies the value of N), the document disposal approval/disapproval determination function 502 transmits a determination result indicating approval to disposal. The document disposal approval/disapproval control function 702 of the document disposal device 70 analyzes the determination result to recognize that it indicates approval to disposal, opens the gate of the shredder unit 73 so that the paper document is received in and disposed of by the shredder unit 73.

The processing operation of the system according to the present invention will be described in more detail in terms of the functional configuration of the devices in the system.

Figure 9:
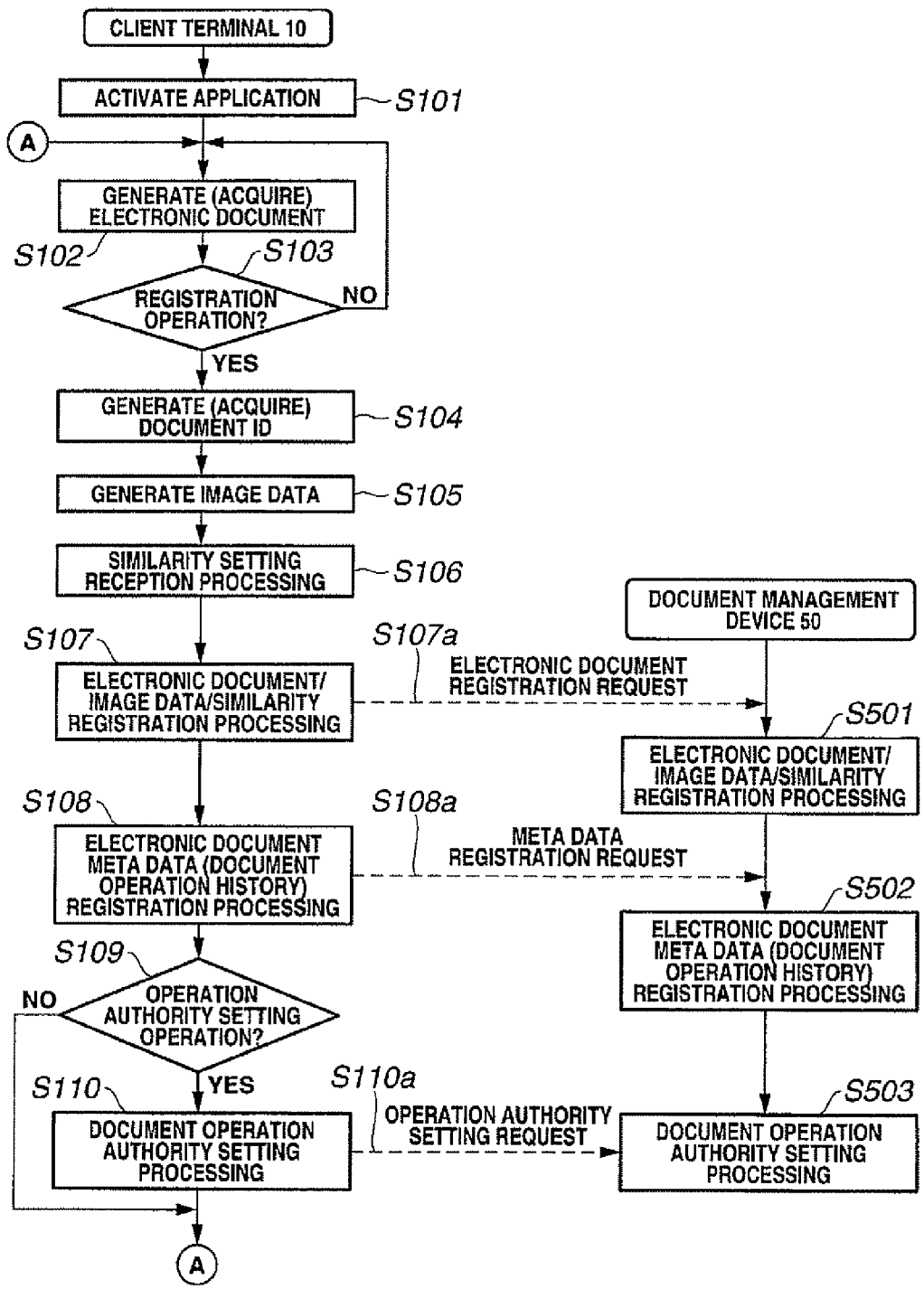
FIG. 9 is a diagram showing control sequence relating to document generation and registration processing.

FIG. 9 is a diagram showing control sequence carried out between the client terminal 10 and document management device 50 relating to the document generation and registration processing in the system according to the present invention.

In the document registration processing shown in FIG. 9, the client terminal 10 instructs the application unit 141 to activate an application (document processing application) in response to a predetermined user operation on the input/operation unit 11 (step S101). The client terminal 10 displays an editing screen for inputting information and generates an electronic document based on the input information (step S102).

During the electronic document generation processing, the document attribute information generation unit 144 monitors whether the user performs a document registration operation on the input/operation unit 11 (step S103). When the registration operation is performed (YES in step S103), the document attribute information generation unit 144 generates a document ID for identifying the electronic document data for example by causing the user to input a desired document ID with the use of a registration setting screen (step S104).

The step S102 described above may include processing to acquire electronic document data preliminarily registered in the document management device 50 or the like. When the electronic document data is acquired from the location where it is registered, the document ID of the electronic document data may be acquired from the registered location in step S104.

Upon completion of the generation of the document ID in step S104 described above, the information registration/acquisition unit 142 subsequently generates image data of the electronic document (step S105). The information registration/acquisition unit 142 further sets a predetermined similarity setting reception screen on the display 12, for example, and performs processing of receiving an input of a desired similarity value on the screen (step S106).

Upon termination of the similarity setting reception processing, the information registration/acquisition unit 142 sequentially performs processing of registering the electronic document, the image data and the similarity value of the electronic document generated so far (step S107) and processing of registering various data including the document ID generated (or acquired) in step S104 (meta data relating to registration of the electronic document data) (step S108).

In the processing of registration of the electronic document, the image data and the similarity value in step S107, the information registration/acquisition unit 142 transmits to the document management device 50 an electronic document registration request containing the electronic document data (generated in step S102 above), the document ID (generated in step S104 above), the image data (generated in step S105 above), and the similarity value (received from the user in step S106) (step S107a).

The document management device 50 receives this electronic document registration request transmitted by the client terminal 10 at the processing request reception unit 541. Upon receiving the registration request, the information management unit 542 stores the electronic document and the image data contained in the registration request in a database (DB) provided in the memory device 53, for example, and registers the storage location and the similarity value contained in the registration request in the registered document management table 522 in association with the document ID of the document contained in the registration request (see FIG. 6) (step S501, electronic document/image data/similarity registration processing).

In the electronic document meta data registration processing in step SI 08 described above, the information registration/acquisition unit 142 transmits to the document management device 50 a registration request containing various meta data relating to the registration of the document, together with the document ID generated by the document attribute information generation unit 144 in the course of generation of the electronic document data (step S108a).

In this document meta data registration processing, the document attribute information generation unit 144 generates, as the meta data, information including the user ID of the user who has generated the document, the date and time of generation of the document, the IP address of the client terminal on which the document has been generated, the type of the document operation ("generation" in this case), and transmits the same as a part of the document meta data registration request.

The document management device 50 receives this electronic document meta data registration request transmitted by the client terminal 10 at the processing request reception unit 541. Upon receiving the registration request, the information management unit 542 stores the document ID and the various meta data contained in the registration request in the document operation history management table 521 in association with each other, as document operation history information (see FIG. 5) (step S502, electronic document meta data registration processing).

For a specific example, when the electronic document generated in step S1102 above and whose document ID of docu00001 has been generated in step S104 above is registered, new entries are generated in association with the document ID of docu00001 as shown in the row indicated by the reference symbol A1 in the document operation history management table 521 shown in FIG. 5, based on the document ID and the document meta data contained in the electronic document meta data registration request from the client terminal 10. The user ID, the date and time of generation of the document, the IP address of the client terminal on which the document was generated, and the type of document operation ("generation") contained as the meta data in the electronic document meta data registration request are stored in the respective entry fields of "user ID", "date and time of operation", "used terminal (IP address)", and "type of operation", as operation history information of the document.

Similarly, when the electronic documents generated in step S102 above and whose document IDs of docu00002, docu00003, and docu00004 are generated in step S104 are registered, document operation ("generation") history information items are stored in the rows indicated by the reference symbols A2, A3, and A4 in the document operation history management table 521 as shown in FIG. 5.

After completion of registration of the document meta data in step S108, the information registration/acquisition unit 142 subsequently proceeds to registration setting processing for setting operation authority for the document data registered in step S107 above.

In this operation authority registration setting processing, the information registration/acquisition unit 142 monitors whether or not operation authority setting is requested after the completion of the registration processing of the document data and the document meta data in steps S107 and S108 (step S109). If operation authority setting is requested (YES in step S109), the information registration/acquisition unit 142 transmits to the document management device 50 an authority setting request containing information on setting particulars input by the user (step S109a). Upon receiving the document authority setting request at the information management unit 542, the document management device 50 performs processing of setting the setting particulars in the document operation authority information management table 523 (step S503).

In the operation authority registration processing for the electronic documents which are generated in step S102 and whose document IDs of docu00001, docu00002, . . . are generated in step S104, operation authority is registered and set for each type of operation, namely, viewing, printing, scanning, copying and disposal in the document operation authority information management table 523 as shown in FIG. 7 (flag "1" indicates the operation is authorized, while no flag indicates the operation is not authorized) in association with the respective document IDs (docu00001, docu00002, . . . ) of the electronic documents, and in association with user attributes. Specifically, security levels are determined corresponding to job titles of the users, for example, level a (high level) is assigned to those holding a position of manager or above, level b (medium level) is assigned to those holding a position of section chief or above, and level c (low level) is assigned to those holding a position as an employee.

Figure 10:
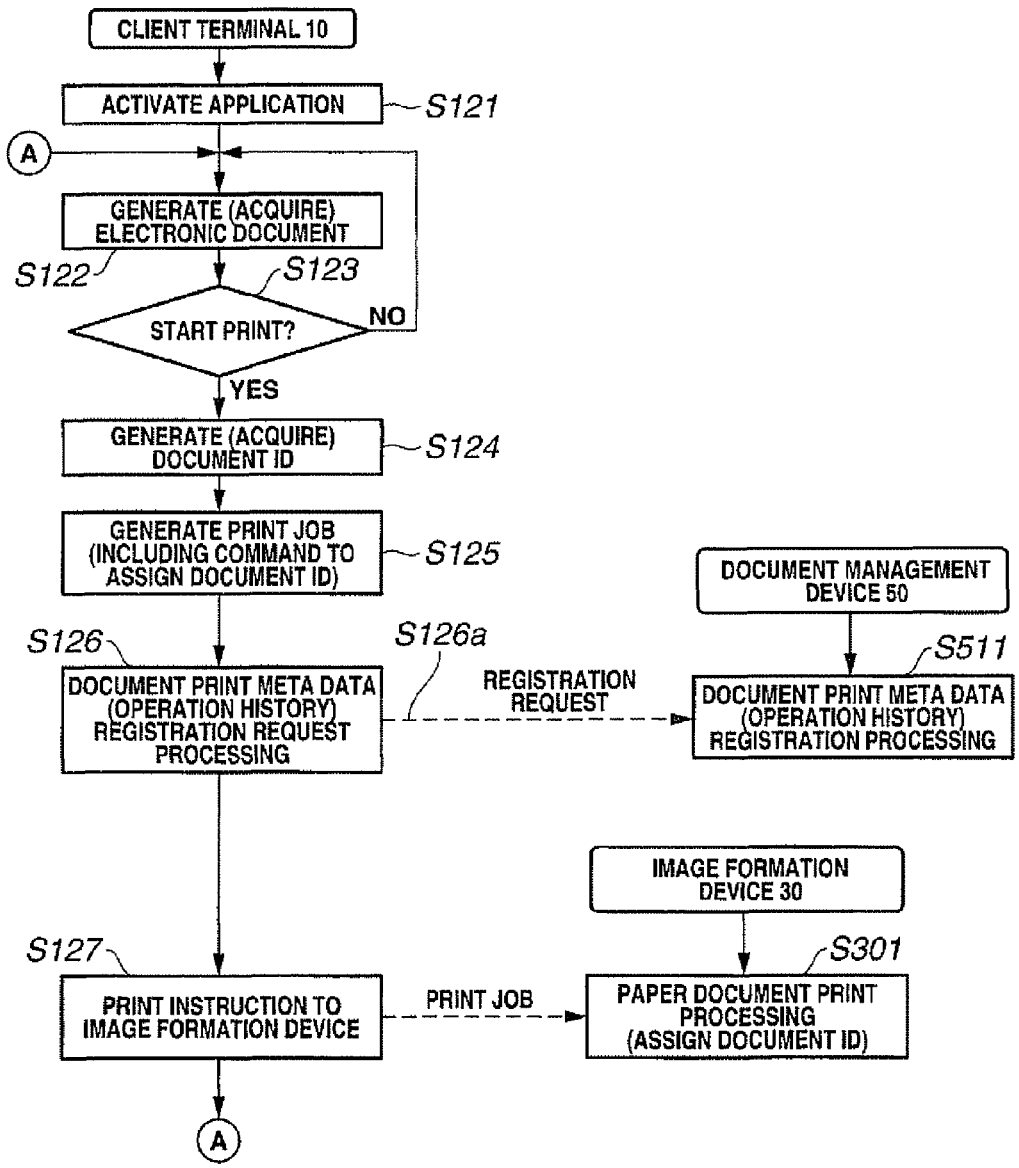
FIG. 10 is a diagram showing control sequence relating to electronic document print processing.
Figure 11A:
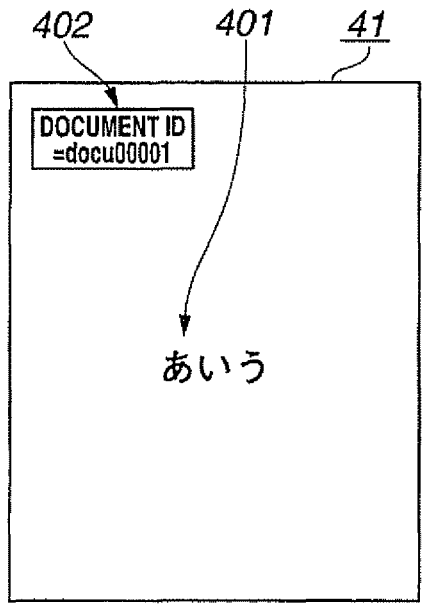
FIG. 11A to FIG. 11D are conceptual diagrams showing examples of paper documents printed out in step S301 of FIG. 10.
Figure 11B:
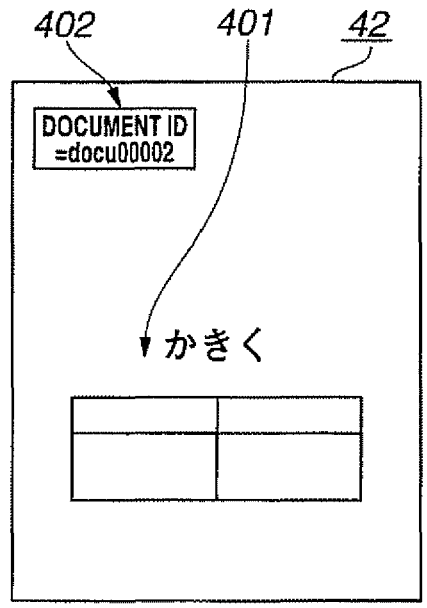
Figure 11C:
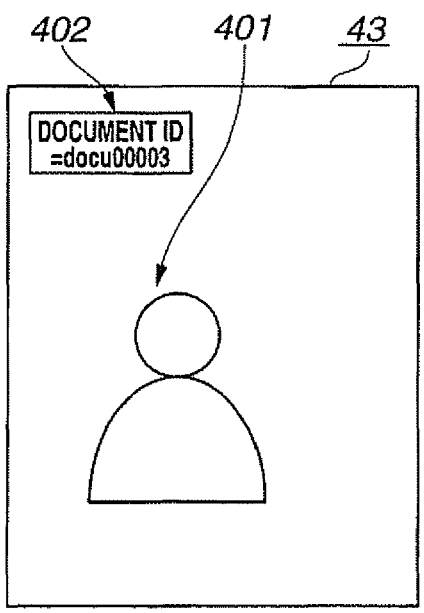
Figure 11D:
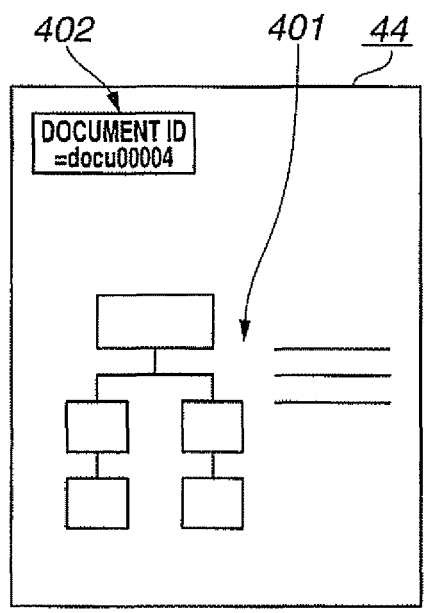

FIG. 10 is a diagram showing control sequence between the client terminal 10 and document management device 50 relating to the electronic document print processing in the system of the present invention.

In the electronic document print processing shown in FIG. 10, the client terminal 10 activates the application in a similar manner to step S101 of FIG. 9, for example (step S121), and then generates or acquires electronic document data in a similar manner to step S102 of FIG. 9 (step S122).

After completion of the generation (or acquisition) of the electronic document data, the document attribute information generation unit 144 monitors whether or not a print start operation for the electronic document is performed by the user using the input/operation unit 11 (step S123). When a print start operation is performed through designating an image formation device 30 as the output destination (YES in step S123), a document ID for identifying a derived document derived by the printing of the electronic document is generated (step S124).

Similarly to step S104 of FIG. 9, the document ID can be generated for example by causing the user to input a desired document ID using a registration setting screen. Alternatively, the document ID may be generated by the document attribute information generation unit 144 computing a hash value as the document ID based on the electronic document data to be printed.

Subsequently, the print job generation unit 143 generates a print job based on the electronic document data generated (or acquired) in step S122 and the document ID generated in step S124 (step S125).

The print job generation unit 143 generates a print job describing a draw command to draw electronic document data to be printed while assigning a corresponding document ID thereto, more specifically a draw command to draw the electronic document data and a QR code corresponding to a hash value computed as the document ID based on the electronic document data.

After the generation of the print job step in S125, the information registration/acquisition unit 142 performs processing of registering meta data relating to the printing of the electronic document in association with the document ID generated in step S124.

In the registration processing of the meta data relating to the document printing, the information registration acquisition unit 142 transmits to the document management device 50 a registration request containing various meta data relating to the document printing together with the document ID (step S126*a*).

When the registration request is transmitted, the document attribute information generation unit 144 generates and transmits, as the meta data, information containing the user ID of the user who printed the document, the date and time when the document was printed, the IP address of the image formation device 30 as the output destination of the document, the type of the document operation ("printing" in this case), and the source document information (the document ID of the electronic document instructed to print).

The document management device 50 receives the document printing meta data registration request transmitted by the client terminal 10 at the processing request reception unit 541. Upon receiving the registration request, the information management unlit 542 stores the document ID and various meta data contained in the registration request in the document operation history management table 521 as document operation history information (see FIG. 5) (step S511, document printing meta data registration processing).

For a specific example, when the electronic document registered and managed in association with the document ID of docu00001 in the registered document management table 522 (see FIG. 6) is printed out, new entries are generated in association with the document ID of docu10001 in the row indicated by the reference symbol B1 in the document operation history management table 521 shown in FIG. 5, based on the document ID and the document meta data contained in the document printing meta data registration request relating to the printing of the document from the client terminal 10. Information items of the user ID (00001 in this case), the date and time of generation of the document (10:20, Sep. 10, 2006 in this case), the IP address of the client terminal as the output destination of the document (123.456.789.311 in this case), and the type of document operation ("printing" in this case) contained as the meta data in the document printing meta data registration request are stored in the respective entry fields of "user ID", "date and time of operation", "used terminal (IP address)", and "type of operation", as operation (printing) history information of the document.

Upon completion of the registration of the document printing meta data, the print job generation unit 143 performs print instruction processing of transmitting the print job generated in step S125 to the image formation device 30 by way of the communication I/F unit 15 through the NW 90 (step S127).

In the image formation device 30, upon receiving the print job transmitted by the client terminal 10 by way of the communication I/F unit 37, the print controller 361 executes processing of printing out a paper document based on the print job (step S301).

In this print processing, the print controller 361 analyzes the draw command in the received print job, and causes the image processing unit 32 to draw each piece of the document data contained in the print job as an image according to the analysis result, and to generate print image data which can be drawn with an image of the QR code corresponding to the document ID contained in the print job embedded at a predetermined position. The print controller 361 causes the image formation unit 34 to output a recording paper (paper document) on which the image of the QR code corresponding to the document ID is formed at the designated position and an image corresponding to the document data is formed, on the basis of the print image data thus generated.

FIGS. 11A to 11D are conceptual diagrams showing examples of paper document printout obtained by the paper document print processing (step S301 of FIG. 10) by the image formation device 30.

FIGS. 11A to 11D respectively illustrate printout examples of the registered electronic documents 1, 2, 3 and 4 managed in the registered document management table 522 (see FIG. 6) in association with the document IDs of docu00001, docu00002, docu00003, and docu00004.

A paper document 41 (shown in FIG. 11A), which is the output result of the electronic document 1, is printed with an image 401 of the document data of the electronic document 1 together with an image 402 of the embedded information (QR code) with the document ID of docu00001 of the electronic document 1.

Similarly, a paper document 42 (shown in FIG. 11B), a paper document 43 (shown in FIG. 11C), and a paper document 44 (shown in FIG. 11D), which are the output results of the electronic documents 2, 3 and 4, are printed with an image 401 of the document data of the electronic documents 2, 3 and 4 together with an image 402 of the embedded information (QR code) having the document IDs of docu00002), docu00003, and docu00004 of the electronic documents 2, 3, and 4, respectively.

Processing operation of the image formation device 30 when copying paper documents having the output modes as shown in FIGS. 11A to 11D will be described.

Figure 12:
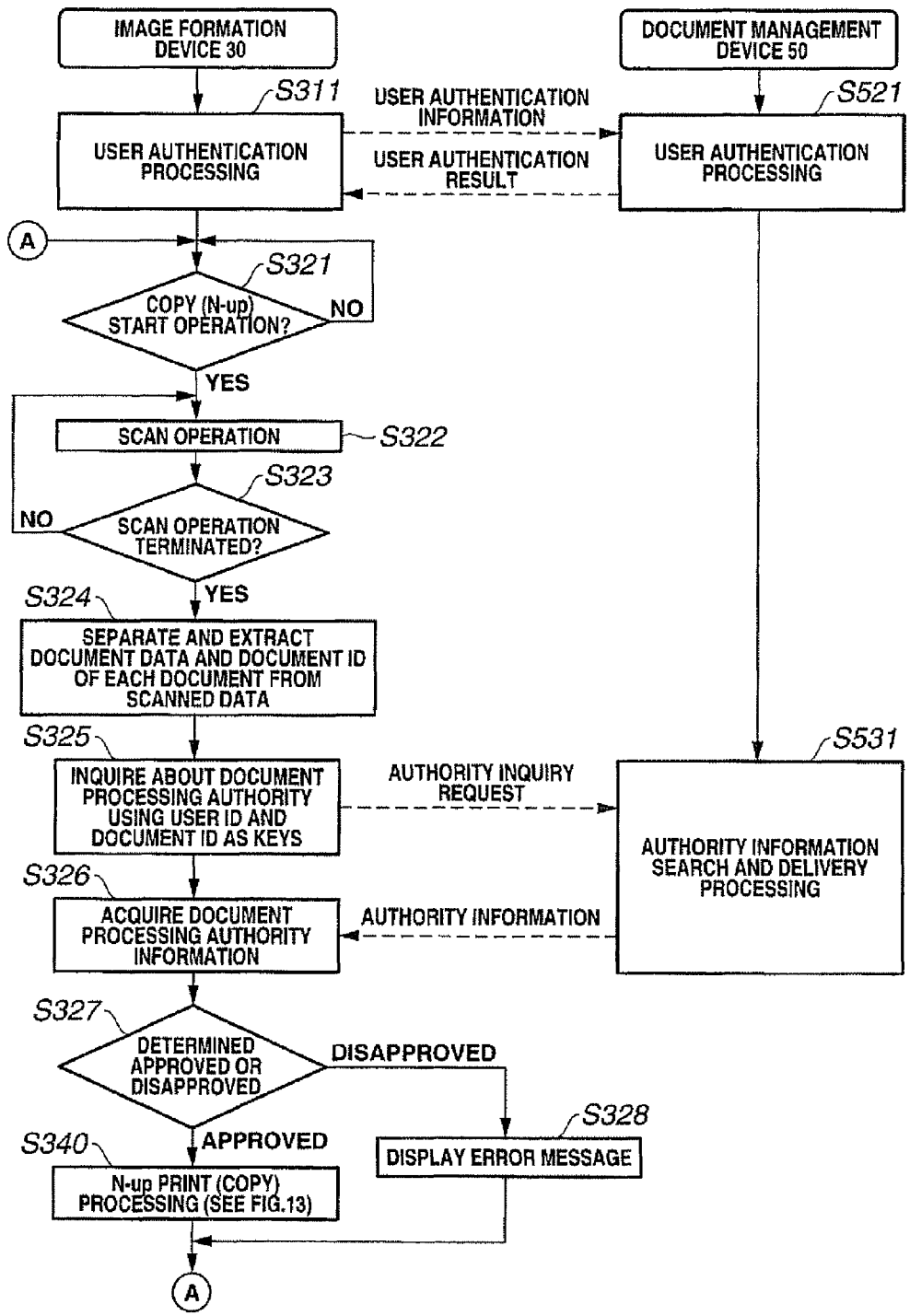
FIG. 12 is a diagram showing control sequence relating to paper document copy processing.

FIG. 12 is a diagram showing control sequence between the image formation device 30 and the document management device 50 in connection with the processing of copying a paper document in the system according to the present invention.

When scanning a paper document with the image formation device 30, the user first performs a user authentication operation.

For receiving the user authentication operation, the user authentication controller 365 displays an operation guidance on the display/operation unit 35 to prompt the user to input the user ID and password, for example, and performs user authentication processing based on the user ID and password input by the user following the operation guidance (step S311).

In this user authentication processing, the user authentication controller 365 transmits to the document management device 50 a user authentication request containing the user ID and password (user authentication information) input by the user.

The document management device 50 accepts (receives) the user authentication request transmitted by the image formation device 30 at the processing request reception unit 541. Upon receiving the request, the user authentication controller 544 extracts the user ID and password from the user authentication request, and performs user authentication processing in which the user authentication controller 544 searches the user attribute information management table (not shown), using the user ID as a key, to determine whether the user is to be authenticated or not depending on whether the user ID is registered and the password registered in association with that user ID matches the received password (step S521), and transmits the determination result (user authentication result) to the image formation device 30.

In the image formation device 30, upon receiving the user authentication result transmitted by the document management device 50, the user authentication controller 365 determines whether the authentication result is affirmative or negative, and if the user authentication result is affirmative, enables the image formation device 30 to accept the user's start operation for various functions.

When copying a paper document, the user sets the paper document, for example, at a predetermined read position on the platen and performs a copy start operation using the display/operation unit 35.

Figure 14:
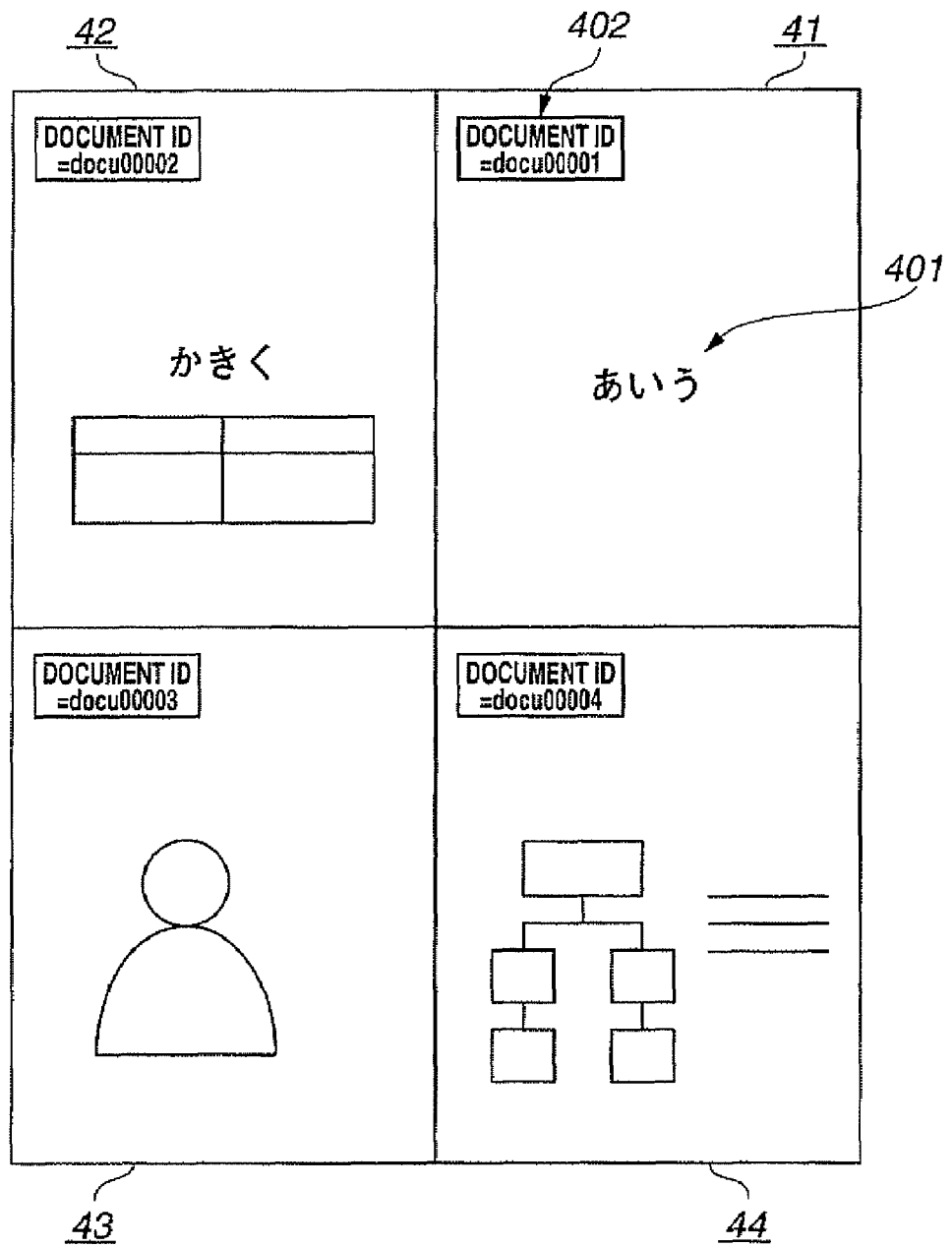
FIG. 14 is a conceptual diagram showing an example of layout of original documents to be copied in a N-up format.

For a specific example, when the four paper documents 41, 42, 43 and 44 shown in FIGS. 11A to 11D are to be copied in 4-up format, the paper documents 41, 42, 43 and 44 are laid out on the platen in a mode shown in FIG. 14, for example. Then, "N-up copy" is selected from the processing menu, and the value of N, or the quantity of the paper documents to be combined into a sheet of paper (quantity of combined documents) is designated as four. Further, the paper size is designated and the "copy start" button is pressed.

In the image formation device 30, on the other hand, the controller 36 monitors whether the copy start operation is performed or not after completion of the user authentication (step S321). When the copy (4-up copy) start operation is preformed (YES in step S321), the controller 36 drives the read unit 31 to scan the image of the paper documents on the platen. This scan operation is continued while storing the image data (scanned data) obtained from the read unit 31, for example, in the memory 33 (step S322).

Upon completion of the scan operation (YES in step S323), the read information extraction unit 362 separates and extracts the document data of the paper documents and the document IDs embedded in the paper documents from the scanned data held in the memory 33 (step S324).

Subsequently, the document processing approval/disapproval controller 366 transmits to the document management device 50 a document processing authority inquiry request containing the document IDs extracted in step S324 and the user ID acquired from the user in the user authentication processing of step S311 (step S325).

In the document management device 50, on the other hand, the document processing authority inquiry request transmitted by the image formation device 30 is accepted (received) at the processing request reception unit 541. Upon receiving the request, the information acquisition/delivery processing unit 543 performs authority information search and delivery processing based on the document processing authority inquiry request (step S531).

In this authority information search and delivery processing, the information acquisition/delivery processing unit 543 extracts the user ID and the document IDs contained in the received document processing authority inquiry request. The information acquisition/delivery processing unit 543 then acquires an authority level corresponding to the extracted user ID (level a, b, or c, determined according to the job title of the user) from a user attribute management table (not shown), checks the document operation authority information management table 523 (see FIG. 7) for authority information (indicating permissible operations "view", "print", "scan", "copy" and so on) associated with the document IDs by using the acquired authority level and the document IDs extracted with the user ID, and notifies the authority information to the image formation device 30.

In the image formation device 30, on the other hand, the document processing approval/disapproval controller 366 receives the authority information transmitted by the document management device 50 (step S326), and analyzes the authority information to determine whether the document processing designated by the user in step S321, namely the copy processing is approved or disapproved (step S327).

If it is determined that the document processing (copy) is not approved (disapproved in step S327), the image formation device 30 displays an error message to that effect on the display/operation unit 35 (step S328), and then returns to the standby state.

If it is determined that the document processing (copy) designated by the user in step S321 is approved (approved in step S327), the print controller 361 cooperates with the information registration/acquisition unit 363 and the document/embedded information generation unit 364 to perform print processing to obtain an N-up copy (4-up copy in this case) based on the document data and the document IDs extracted from the scanned data in step S324, and the paper size and the value of N designated by the user in step S321 (step S340).

The N-up print (copy) processing in step S340 will be described in detail with reference to FIG. 13 indicating control sequence between the image formation device 30 and the document management device 50.

The N-up print processing shown in FIG. 13 is started by the determination that the copy is approved in step S327 of FIG. 12 (approved in step S327).

Upon proceeding to the N-up print processing (step S340), the document/embedded information generation unit 364 generates a derived document ID for identifying that the N-up copy is a derived document from the paper documents, for example, by causing the user to input a desired document ID with the display/operation unit 35 (step S341).

The document/embedded information generation unit 364 then generates a combination ID (N-up ID, or N pieces of information having serial numbers of 1/N, 2/N, . . . , and N/N to be embedded in the respective pieces of the document data extracted in step S324 to identify which page each piece of the document data corresponds to in the N-up print), based on the value of N designated by the copy (N-up copy) start operation in step S321 (step S342).

Subsequently, based on the value of N and the paper size designated by the copy start operation in step S321, and the derived document ID and the N-up IDs generated in steps S341 and S342, the print controller 361 generates a print job containing a command to draw the document data of the respective N source documents (paper documents) as an image scaled to a size corresponding to the value of N (N-up image, or combined image in the claims) on a single sheet of paper having the above-mentioned paper size, a command to draw with the derived document ID embedded at a specific position (a single position) on the paper, and a command to draw with respective pairs of document ID and N-up ID of the source documents embedded in the respective pieces of the N-up images (step S343).

Upon completion of the generation of the print job, the information registration/acquisition unit 363 sequentially performs processing of registering various data relating to the N-up copy (meta data, including the document IDs extracted in step S324 and the derived document ID generated in step S341) (step S344), and processing of requesting generation of comparison image data corresponding the respective source documents of the N-up copy (original documents).

In the meta data registration processing in step S344, the information registration/acquisition unit 363 transmits to the document management device 50 a request for registration of the meta data (operation history information) including the document IDs extracted in step S324, the derived document ID generated in step S341, and other information relating to the N-up copy such as the user ID, date and type of operation, used terminal (IP address), type of operation (N-up copy), and document IDs of the source paper documents (step S3441).

In the document management device 50, the processing request reception unit 541 receives the meta data registration request transmitted by the image formation device 30. Upon receiving the request, the information management unit 542 stores the various meta data in the document operation history management table 521 as history information of the document operation (N-up copy of paper documents) in association with the derived document ID contained in the registration request (see FIG. 5) [step S541: meta data "operation (N-up print) history" registration processing].

For a specific example, when the paper documents 41, 42, 43, 44 are set to the original documents and copying in 4-up format is performed by arranging the original documents in a mode as shown in FIG. 14, new entries corresponding to the derived document ID of docu20001 are generated in the row indicated by the reference symbol C1 in the document operation history management table 521 of FIG. 5, based on the document ID (derived document ID generated in step S341) and the meta data [including the document IDs of the source documents (original documents of N-up copy) extracted in step S324] contained in the meta data registration request from the image formation device 30. The information items contained in the meta data registration request as the meta data, namely the user ID of the user who performed the N-up copy (00001 in this case), the date and time of copying (11:15, Sep. 11, 2006 in this case), the IP address of the image formation device 30 on which the copy was performed (123.456.789.311 in this case), the type of document operation ("4-up copy", in this case), and the document IDs (docu10001, docu10002, docu10003, and docu10004) of the source documents are stored as the operation (N-up copy) history information of the derived document in the respective entry fields of "user ID", "date and time of operation", "used terminal (IP address)", "type of operation", "source document".

In the processing of requesting generation of image data for comparison in step S345, the information registration/acquisition unit 363 transmits to the document management device 50 a comparison image data generation request containing the paper size and the value of N designated in the copy start operation in step S321 and the document IDs extracted from the scanned data in step S324 (step S3451).

In the document management device 50, the processing request reception unit 541 receives the comparison image data generation request transmitted by the image formation device 30. Upon receiving the request, the information management unit 542 retrieves from the memory device 53 the image data of the electronic documents corresponding to the document IDs contained in the comparison image data generation request, scales the retrieved image data at a scaling ratio corresponding the paper size and the value of N contained in the comparison image data generation request, and stores the scaled image data as the comparison image data in a predetermined region in the memory device 53 (step S551, comparison image data generation processing).

After the completion of the comparison image data generation processing, the image formation device 30 receives a notification to that effect from the document management device 50 (data generation completion notification in step S5551). Upon receipt of the notification, the print controller 361 performs print processing of a paper document corresponding to the N-up copy result, based on the print job generated in step S344 (step S346), and the image formation device 30 returns to step S321 of FIG. 12 upon completion of the printing (N-up copy) of the paper document.

In paper document print processing (N-up copy) in step S346, the print controller 361 analyzes the draw command contained in the print job and, according to the analysis result, causes an N-up ID added document (N-up copy) to be printed out in which images corresponding to the combined image data of the plural original documents (paper documents) (image data obtained by scaling the image data read from the paper documents according to the designated paper size and the value of N) are arranged in the respective regions of the N-divided regions designated by their N-up IDs, with the document ID and the N-up ID being embedded in each of the document, and an image corresponding to the derived document ID is embedded in a specific position (for example, at one point) of the N-up ID added document.

Figure 15:
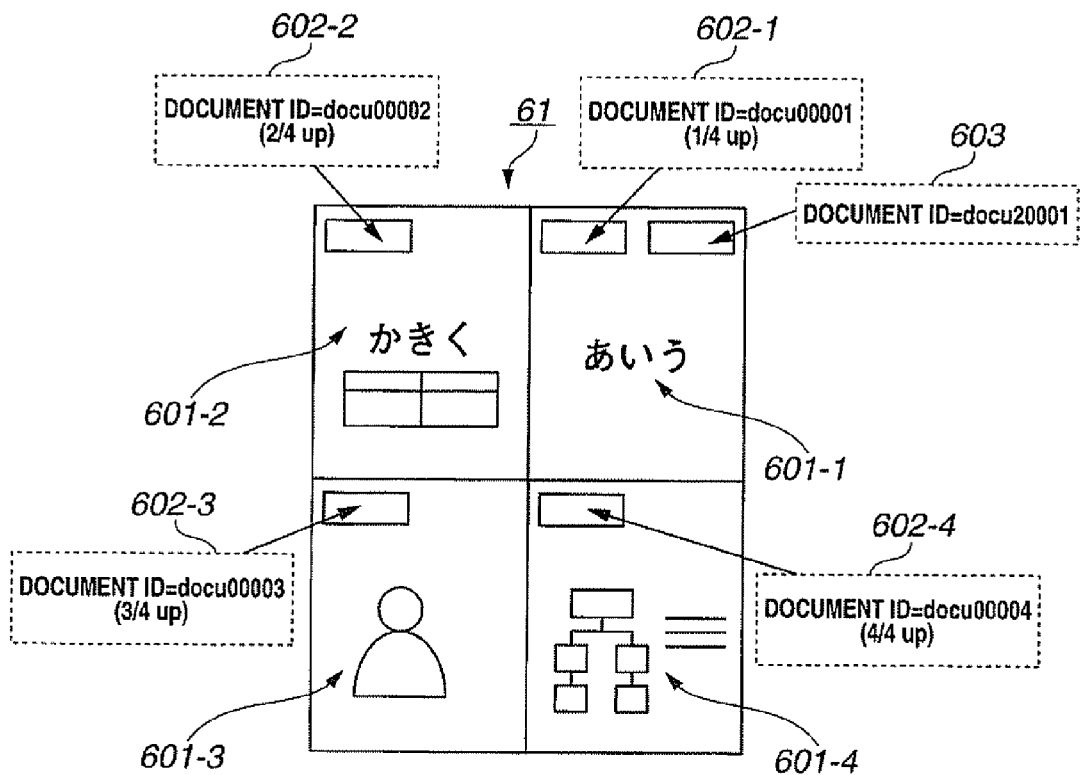
FIG. 15 is a conceptual diagram showing an output result of an N-up copy.

For a specific example, when the paper documents 41, 42, 43 and 44 are the original documents and copying in 4-up format is performed by arranging the original documents as shown in FIG. 14, a paper document 61 is printed out as shown in FIG. 15, the paper document 61 including N-up images 601-1, 601-2, 601-3 and 601-4 corresponding to the respective pieces of the document data (N-up reduced document data) of the original documents (paper documents 41, 42, 43 and 44) of the 4-up copy; images 602-1, 602-2, 602-3 and 602-4 corresponding to four pairs of document ID and N-up ID (docu00001: 1/4up), (docu00002: 2/4up), (docu00003: 3/4up) and (docu00004: 4/4up) formed by associating the document IDs and the N-up IDs of the paper documents 41, 42, 43 and 44, which is the original documents, and embedded in the respective N-up images 601-1, 601-2, 601-3 and 601-4; and an image 603 corresponding to the derived document ID (docu20001) embedded for identifying the 4-up copy result.

The images 602-1, 602-2, 602-3 and 602-4 and the image 603 may be formed as QR codes having the respective corresponding values stated above.

Figure 16:
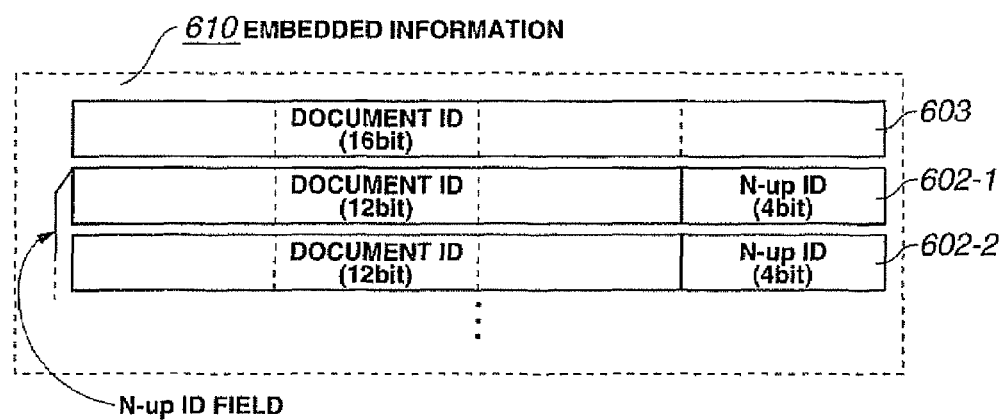
FIG. 16 is a conceptual diagram showing an information structure of embedded information included in the output result of N-up copy.

FIG. 16 is a conceptual diagram showing an information structure of the embedded information held in the N-up copy result (e.g. the paper document 61 shown in FIG. 15) in the system according to the present invention.

As shown in FIG. 16, the N-up copy result such as the paper document 61 holds, as the embedded information 610, information of one derived document ID (corresponding to the image 603 of FIG. 15) formed by 16 bits, and information of N pairs of document ID and N-up ID (corresponding to the images 602-1, 602-2, 602-3 and 602-4 in FIG. 15) each formed by a 12-bit document ID and a 4-bit N-up ID, and respectively associated with the N original documents.

Operation in the paper document disposal processing of the document disposal device 70 will be described.

Figure 17:
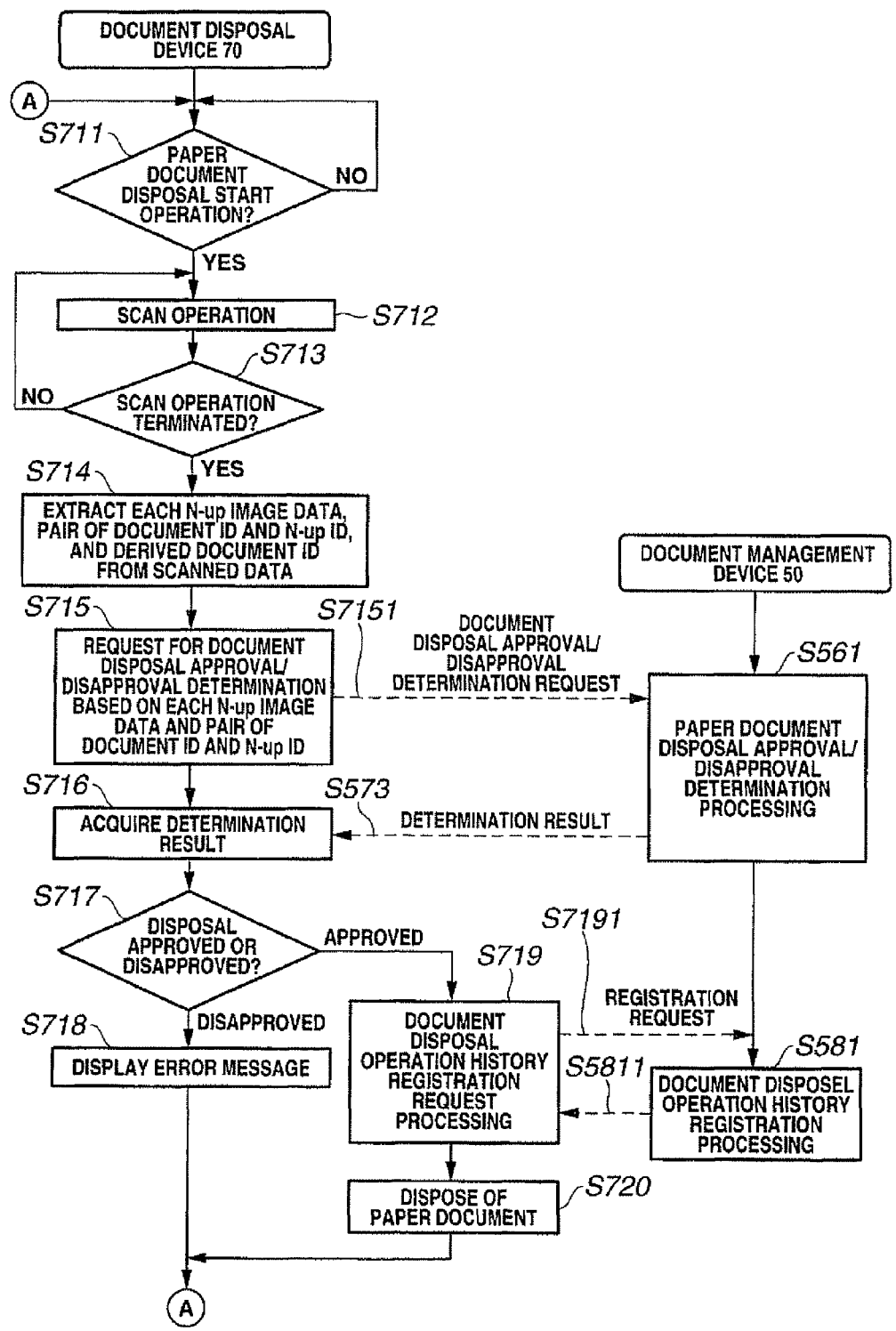
FIG. 17 is a diagram showing control sequence relating to paper document disposal processing.

FIG. 17 is a diagram showing control sequence between the document disposal device 70 and the document management device 50 relating to the paper document disposal processing in the system according to the present invention.

With reference to this control sequence, the disposal processing operation will be described while assuming that the paper document (4-up copy result) 61 shown in FIG. 15, for example, is to be disposed of.

In the paper document disposal processing as well, the disposal control is executed only after the document operation authority is confirmed by the user authentication performed by the document disposal device 70 (user authentication controller 753) in cooperation with the document management device 50 (user authentication controller 544), similarly to the case where the N-up copy or other operation is conducted on the image formation device 30. However, description of the user authentication processing and the document operation authority confirmation processing is omitted here.

As shown in FIG. 17, the document disposal approval/disapproval controller 752 in the document disposal device 70 monitors, in the standby state, whether or not a paper document is placed for disposal in the object-for-disposal storing unit 71 and a disposal start operation is performed by the user with the display/operation unit 74 (step S711).

If the disposal start operation is performed here (YES in step S711), the information read controller 751 drives the read unit 72 to perform a scan operation in which an image of the paper document placed for disposal is scanned by the read unit 72, and pieces of image data (scanned data) obtained from the read unit 72 are sequentially stored (step S712).

After completion of this scan operation (YES in step S713), the document disposal approval/disapproval controller 752 separates and extracts from the scanned data obtained so far, N (=1, 2, 4, 6, . . . ) pairs of document ID and N-up ID; N pieces of N-up image data (N-up image data of the respective paper documents to be copied in N-up format) corresponding to the respective pairs of document ID and N-up ID; and a single derived document ID embedded at a predetermined position of the paper document (step S714).

For a specific example, when the paper document 61 (see FIG. 15) is placed for disposal and the disposal start operation is performed, information is separated and extracted from the scanned data of the paper document 61, the extracted information having four pieces of N-up image data 1/4up, 2/4up, 3/4up and 4/4up, and four pairs of document ID and N-up ID (docu00001 and 1/4up), (docu00002 and 2/4up), (docu00003 and 3/4up) and (docu00004 and 4/4up) embedded respectively in the four N-up images, and a document ID (docu20001) of the paper document 61.

Subsequently, the document disposal approval/disapproval controller 752 performs processing of requesting a disposal approval/disapproval determination for the paper document placed for disposal, based on the N-up image data and the pairs of document ID and N-up ID corresponding to the N-up image data extracted in the step S714 (step S715).

In this processing, the document disposal approval/disapproval controller 752 transmits to the document management device 50 a document disposal approval/disapproval determination request containing information of the N-up image data and the pairs of document ID and N-up ID corresponding to the N-up image data extracted in step S714 (step S7151).

On the other hand, in the document management device 50, the document disposal approval/disapproval determination request transmitted by the document disposal device 70 is accepted (received) at the processing request reception unit 541. Upon reception of the request, the document disposal approval/disapproval determination processing unit 545 determines whether the disposal of the paper document is approved (permitted) or disapproved (prohibited) based on the document disposal approval/disapproval determination request (step S561).

In this paper document disposal approval/disapproval determination processing (step S561), as described later in more detail with reference to FIG. 18, the document disposal approval/disapproval determination processing unit 545 extracts the pieces of N-up image data and the pairs of document ID and N-up ID corresponding thereto from the received document disposal approval/disapproval determination request, and then compares, using each of the document IDs paired with the N-up IDs as a key in the ascending order of the values of the N-up IDs, the N-up image data (contained in the document disposal approval/disapproval determination request) corresponding to the document ID with the N-up image data registered in the memory device 53 in association with the document ID (hereafter, referred to as the "comparison image data") to compute a similarity value. The document disposal approval/disapproval determination processing unit 545 generates a determination result for all pieces of the N-up image data by determining whether or not the disposal is to be approved depending on whether or not the similarity value exceeds a set similarity value corresponding thereto (similarity value set as a threshold value) and whether or not the quantity of the pieces of N-up image data contained in the document disposal approval/disapproval determination request satisfies the value of N, and transmits the generated determination result to the document disposal device 70 (step S573).

On the other hand, in the document disposal device 70, upon receiving the determination result transmitted from the document management device 50 in response to the document disposal approval/disapproval determination request transmitted in step S7151 (step S716), the document disposal approval/disapproval controller 752 determines whether or not the determination result indicates approval of disposal of the document (step S717).

If it is determined that the disposal of the document is not approved (disapproved in step S717), an error message to that effect is displayed on the display/operation unit 74 (step S718). A control to prohibit the disposal of the paper document is performed (for example, by backward feeding the paper document being placed), and the document disposal device 70 returns to the standby state.

In contrast, when it is determined that the disposal of the document is approved (approved in step S717), the document disposal approval/disapproval controller 752 proceeds to document disposal operation history registration request processing (step S719).

In this document disposal operation history registration request processing, the document disposal approval/disapproval controller 752 transmits to the document management device 50 a request for registration of meta data (operation history information) including the derived document ID extracted from the scanned data in step S714, the user ID of the user who performed the disposal operation of the paper document, the date and time of the operation, the used terminal (IP address), and the type of operation (disposal of the N-up copy) (step S7191).

In the document management device 50, upon receiving the meta data registration request transmitted by the image formation device 30 at the processing request reception unit 541, the information management unit 542 stores the various meta data as document operation (disposal of N-up copy) history information (see FIG. 5) in the document operation history management table 521 in association with the respective source document IDs contained in the registration request [step S581: document disposal meta data (operation history) registration processing].

For a specific example, when disposal of the paper document 61 (4-up copy derived from the paper documents 41, 42, 43 and 44) shown in FIG. 15 is carried out, new entries are generated in the document operation history management table 521 based on the derived document ID (extracted from the paper document 61 in step S714) and the meta data contained in the meta data registration request from the document disposal device 70 while being associated with a derived document ID (docu20001) in the row indicated by the reference symbol D1 in the document operation history management table 521 as shown in FIG. 5. In the respective entries fields of "user ID", "date and time of operation", "used terminal (IP address)" and "type of operation", the user ID of the user who performed the disposal of the N-up copy (00001 in this case); the date and time performed the disposal (10:15, Sep. 15, 2006 in this case); the IP address of the document disposal device 70 with which the disposal is performed (123.456.789.711 in this case); and the type of document operation ("disposal"), each of which is contained as meta data in the meta data registration request, are stored as document operation (N-up copy disposal) history information.

After completion of the document disposal operation history registration processing, the document management device 50 notifies the document disposal device 70 to that effect (registration completion notification in step S5811). Upon receiving the notification, the document disposal approval/disapproval controller 752 in the document disposal device 70 controls the gate of the shredder unit 73 in the open state to receive the paper document which is being placed for disposal, while driving the shredder unit 73 to shred the paper document (step S720). Upon completion of the shredding (disposal of the document), the document disposal device 70 returns to the standby state (step S711).

The paper document disposal approval/disapproval determination processing in step S561 of FIG. 17 will be described in more detail with reference to the flowchart of FIG. 18.

As shown in FIG. 18, the document management device 50 monitors whether or not the document disposal approval/disapproval determination request transmitted by the document disposal device 70 in step S7151 of FIG. 12 is received (step S562). When receiving the disposal approval/disapproval determination request (YES in step S562), the document disposal approval/disapproval determination processing unit 545 extracts the pieces of N-up image data and the pairs of document ID and N-up ID corresponding thereto contained in the disposal approval/disapproval determination request (step S563).

Subsequently, the document disposal approval/disapproval determination processing unit 545 updates the count value n of an N-up counter from the initial value "0" to "1" (step S564), and specifies a document ID to be paired with the N-up ID having the updated count value "1" from among the pairs of document ID and N-up ID extracted in step S563 (step S565).

Subsequently, the N-up image data of the electronic document corresponding to the specified document ID (the image data registered as the comparison image data by the processing in step S5551 of FIG. 13) is retrieved from the memory device 53, so that the N-up image data piece corresponding to the document ID among the N-up image data pieces extracted from the document disposal approval/disapproval determination request in step S563 above is compared with the retrieved comparison image data to compute a similarity value (step S566).

The computation of similarity between the N-up image data and the comparison image data in step S566 can be realized by employing a known method of similar image determination processing (see, for example, Japanese Patent Application Laid-Open No. 11-339024).

Subsequently, a similarity value (set value) preliminarily set in association with the document ID specified in step S565 is retrieved from the registered document management table 522 (see FIG. 6) (step S567), and it is determined whether or not the similarity value computed in step S566 exceeds the set value (step S568).

If the similarity value exceeds the set value (step S568 YES), it is checked whether there exists another subsequent pair of document ID and N-up ID (step S569).

The processing steps from step S564 to S569 are repeated by the document disposal approval/disapproval determination processing unit 545 as long as it is determined that there exists another subsequent pair of document ID and N-up ID in step S569 (YES in step S569).

In these repeated processing steps, the document disposal approval/disapproval determination processing unit 545 sequentially updates the count value n of the N-up counter by adding the same by one every time it is determined that there is another subsequent pair of document ID and N-up ID (YES in step S569) (step S564), and specifies the document ID paired with the N-up ID having the updated N-up count value n (=2, 3, . . . ) (step S565). The document disposal approval/disapproval determination processing unit 545 then compares the N-up image data corresponding to the specified document ID with the comparison image data to compute a similarity value (step S566), and retrieves the similarity value (set value) preliminarily set in association with the document ID specified in step S565 (step S567) to determine whether or not the similarity value computed in step S566 exceeds the set value (step S568).

During the time when the processing steps are thus performed for all the pairs of document ID and N-up ID extracted from the document disposal approval/disapproval determination request received from the document disposal device 70 (steps S564 to S568), if it is determined that a similarity value between N-up image data corresponding to a certain document ID and comparison image data associated therewith does not exceed the set value (NO in step S568), the document disposal approval/disapproval determination processing unit 545 generates a determination result of disapproval of document disposal (step S572), notifies (transmits) the determination result (disapproval of document disposal) to the document disposal device 70 (step S573), and then returns to step S562.

When the determination processing is performed for all the pairs of document ID and N-up ID extracted from the document disposal approval/disapproval determination request without reaching a determination that a similarity value between N-up image data corresponding to each document ID and comparison image data associated therewith exceeds the set value (YES in step S568) before it is determined that there exists no more subsequent pair of document ID and N-up ID (no step S569), the document disposal approval/disapproval determination processing unit 545 checks whether or not the count value n of the N-up counter reaches the value of N indicated by the N-up ID extracted from the document disposal approval/disapproval determination request (step S570).

If the count value n of the N-up counter does not reach the value of N (NO in step S570), the document disposal approval/disapproval determination processing unit 545 generates a determination result of disapproval of document disposal (step S572) similarly to when the similarity value does not exceed the set value in step S568 (NO in step S568), notifies (transmits) the determination result (disapproval of document disposal) to the document disposal device 70 (step S573), and then returns to step S562.

In contrast, if the count value n of the N-up counter reaches the value of N (YES in step S570), the document disposal approval/disapproval determination processing unit 545 generates a determination result of approval of document disposal (step S571), notifies (transmits) the determination result (approval of document disposal) to the document disposal device 70 (step S573), and then returns to step S562.

According to the paper document disposal approval/disapproval determination control processing (step S561) shown in FIG. 18, the document management device 50 (document disposal approval/disapproval determination processing unit 545) receives from the document disposal device 70 a document disposal approval/disapproval determination request containing pieces of N-up image data read from a paper document as an N-up copy result, and pairs of document ID and N-up ID corresponding to the respective pieces of N-up image data; and checks, for every piece of N-up image data, whether or not a similarity value between the N-up image data and the comparison image data exceeds a set value previously set in association therewith, and whether or not the number of pieces of N-up image data satisfies the value of N. If the similarity value exceeds the set value for every piece of the N-up image data and the number of pieces of N-up image data satisfies the value of N, the document management device 50 transmits a determination of approval of document disposal as a response to the document disposal device 70, which is a source of the disposal approval/disapproval determination request. On the other hand, if the similarity value of any one of the pieces of N-up image data with the comparison image data associated therewith is smaller than the set value, or when the number of the pieces of N-up image data does not satisfy the value of N, the document management device 50 transmits a determination of disapproval of document disposal.

The document disposal device 70 (document disposal approval/disapproval controller 752) thus receives the determination result transmitted by the document management device 50 in response to the document disposal determination request, and performs disposal of the document placed for disposal if the determination result is approval, whereas performs control to prohibit the disposal of the paper document if the determination result is disapproval.

For a specific example of the document disposal operation based on such control, when the paper document 61 shown in FIG. 15 is placed for disposal in the document disposal device 70, the document disposal device 70 transmits to the document management device 50 a document disposal approval/disapproval determination request containing four pieces of N-up image data 1/4up, 2/4up, 3/4up and 4/4up read from the paper document 61, and four pairs of document ID and N-up ID (docu00001 and 1/4up), (docu00002 and 2/4up), (docu00003 and 3/4up), and (docu00004 and 4/4up) embedded in the respective four pieces of the N-up image.

Upon receiving the document disposal approval/disapproval determination request from the document disposal device 70, the document management device 50 performs, based on the request, the paper document disposal approval/disapproval determination processing (see FIG. 18) in which a similarity value between each piece of the N-up image data and the corresponding comparison N-up image data is computed for the four pieces of N-up image data sequentially in the order of 1/4up, 2/4up, 3/4up and 4/4up by using the document IDs docu00001, docu00002, docu00003 and docu00004 as a key, and it is determined whether or not the computed similarity values exceed the respective set values (95%, 85%, 95% and 70%, see FIG. 6) (steps S564 to S568). In this determination processing, the similarity value between the N-up image data with the document ID docu00004 and the corresponding comparison N-up image data is determined to exceed the set value (YES in step S568). Accordingly, a subsequent document ID is searched for and it is determined that there is no more subsequent document ID (NO in step S569). In the next step S570, the N-up count value n of four is compared with the value of N of four, and it is determined that the quantity of the pieces of the N-up image data satisfies the value of N (=4) (YES in step S570). As a result, a determination result of approval of disposal is notified to the document disposal device 70 (step S571) and the paper document 61 is disposed of.

Figure 19A:
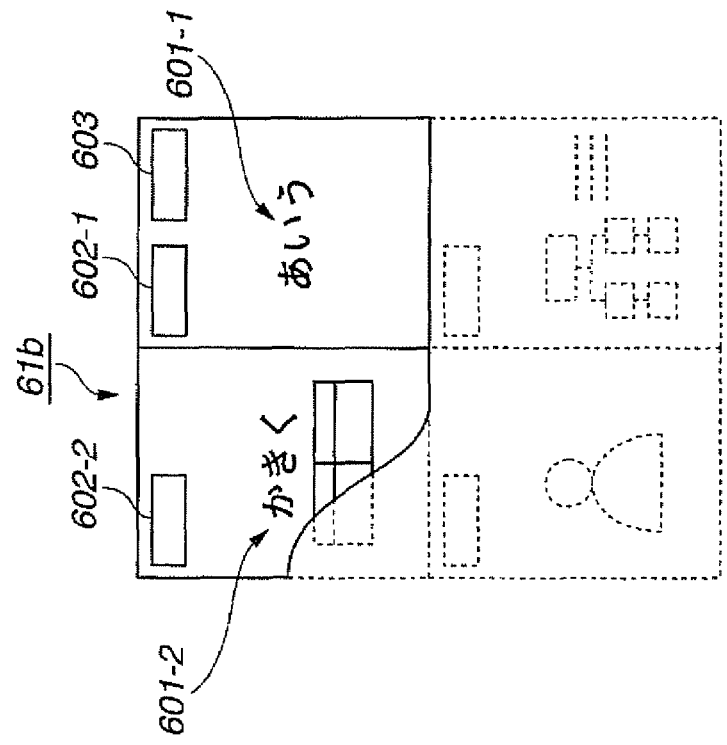
Figure 19B:
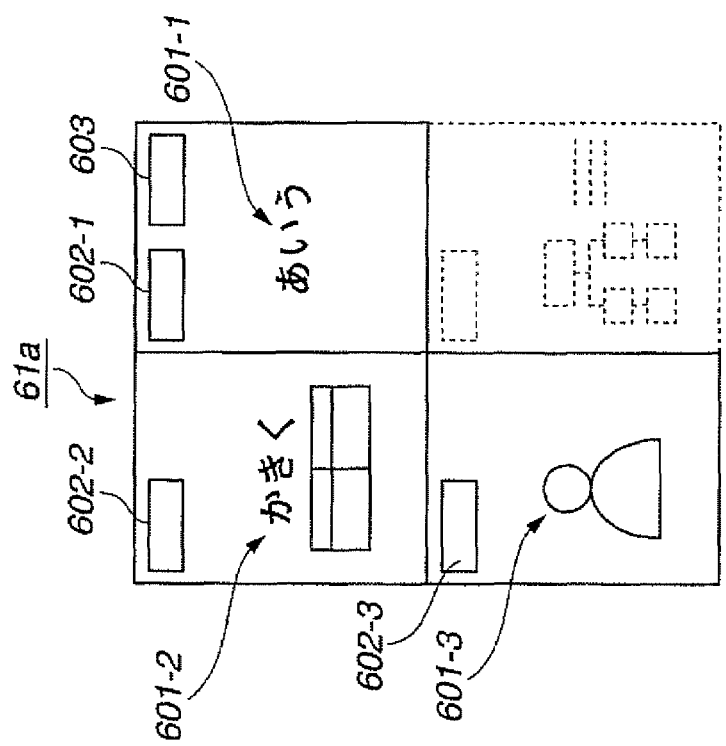

For another specific example, consideration will be given to the disposal approval/disapproval control when paper documents as shown in FIG. 19A and FIG. 19B are placed for disposal.

FIG. 19A and FIG. 19B shows examples of paper documents obtained by partially cutting off the paper document 61 of FIG. 15.

Specifically, FIG. 19A shows a paper document 61a which is obtained by cutting off the image data with the N-up ID of 4/4up and the information embedded therein (the pair of document ID and N-up ID) from the paper document 61. FIG. 19B shows a paper document 61b obtained by cutting off from the paper document 61 the image data with the N-up ID of 4/4up and the information embedded therein (pair of document ID and N-up ID); the image data with the N-up ID of 3/4up and the information embedded therein (the pair of document ID and N-up ID); and a part of the image data with the N-up ID of 2/4up.

When the paper document 61a shown in FIG. 19A is placed for disposal in the document disposal device 70 and the disposal start operation is performed, the document disposal device 70 transmits to the document management device 50 a document disposal approval/disapproval determination request containing three pieces of N-up image data of 1/4up, 2/4up and 3/4up read from the paper document 61a and three pairs document ID and N-up ID, (docu00001 and 1/4up), (docu00002 and 2/4up), and (docu00003 and 3/4up), embedded in the three pieces of N-up image, respectively.

Upon receiving the document disposal approval/disapproval determination request from the document disposal device 70, the document management device 50 performs, based on the request, the paper document disposal approval/disapproval determination processing (see FIG. 18) in which a similarity value between the N-up image data and the corresponding N-up image data is computed for each of the three pieces of N-up image data sequentially in the order of 1/4up, 2/4up, and 3/4up by using the document IDs docu00001, docu00002, and docu00003 as a key, and it is determined whether or not the computed similarity values exceed the respective set values (steps S564 to S568). In this determination processing, the similarity value between the N-up image data with the document ID docu00003 and the corresponding comparison N-up image data is determined to exceed the set value (YES in step S568). Accordingly, a subsequent document ID is searched for and it is determined that there is no subsequent document ID (NO in step S569). In the next step S570, the N-up count value n of three is compared with the value of N of four, and it is determined that the quantity of the pieces of the N-up image data does not satisfy the value of N (=4) (NO in step S570). As a result, a determination result of disapproval is notified to the document disposal device 70 (step S572), and the disposal of the paper document 61a is prohibited.

When the paper document 61b shown in FIG. 19B is placed for disposal in the document disposal device 70 and the disposal start operation is performed, the document disposal device 70 transmits to the document management device 50 a document disposal approval/disapproval determination request containing two pieces of N-up image data of 1/4up and 2/4up read from the paper document 61b (the N-up image data of 2/4up is partially lost) and two pairs of document ID and N-up ID, (docu00001 and 1/4up) and (docu00002 and 2/4up), embedded in the two pieces of N-up image, respectively.

Upon receiving the document disposal approval/disapproval determination request from the document disposal device 70, the document management device 50 performs, based on the request, the paper document disposal approval/disapproval determination processing (see FIG. 18) in which a similarity value between the N-up image data and the corresponding N-up image data is computed for each of the two pieces of N-up image data sequentially in the order of 1/4up and 2/4up by using the document IDs docu00001 and docu00002 as a key, and it is determined whether or not the computed similarity values exceed the respective set values (steps S564 to S568). When the similarity value between the N-up image data with the document ID docu00002 and the corresponding comparison N-up image data is computed and determined whether or not it exceeds the set value (step S568), it is determined that the similarity value is smaller than the set value (85%, see FIG. 6) since the N-up image data corresponding to docu00002 is partially lost (NO step S568). As a result, a determination result of disapproval is notified to the document disposal device 70 (step S572) and the disposal of the paper document 61b is prohibited.

The embodiment above has been described in terms of the case where the paper document 61 as an N-up copy is disposed of. However, the present invention is also applicable to disposal control of diplex-printed paper documents or paper documents on the both sides of which N-up printing is employed.

It should be noted that, in order to enable the disposal control of a duplex-printed paper document (derived document) by tracing source documents of that derived paper document, configuration may be such that the print controller 361 (combination ID added print function 301) in the image formation device 30 is provided with a function to print out a designated document in a duplex form while embedding document identification information and combination IDs of (1/2) and (2/2) in the document image data on each side of a paper document, while the read unit 72 in the document disposal device 70 is provided with a function to read/scan the both sides of the paper document. The document disposal approval/disapproval controller 752 (combination ID added document disposal approval/disapproval determination request function 701) extracts the image data and the pair of document ID and combination ID by reading and scanning each side of the paper document with the read unit 72, and makes a document disposal approval/disapproval determination request to the document management device 50, using the extracted image data and the pair of document ID and combination ID.

Further, the present invention is not limited to the example as described above and illustrated in the drawings, but may be otherwise variously embodied without departing from the spirit and scope of the invention.

For example, although the description of the embodiments above has been made in terms of an example in which document IDs and combination IDs are printed in QR codes, the document IDs and combination IDs may be printed by using mechanical readable symbols such as two-dimensional bar codes. Alternatively, a watermark printing technique may be employed to print a hybrid watermark or the like.

Further, in the embodiments above, a document disposal management program is installed in the image formation device 30, the document management device 50, and the document disposal device 70 (the devices are integrally referred as a computer) so that the computer is caused by the program to function as: a print unit which performs multiple-page combined printing for printing plural documents as a paper document in which pieces of combined image data of the documents enlarged or reduced according to a designated paper size and the number of combination are arranged in respective N regions obtained by dividing an image forming region and indicated by combination identification information n/N (n is an integer of one or greater), the pieces of combined image data being each embedded with a document identification information and the combination identification information; a management unit which manages, in association with the document identification information, comparison image data obtained by enlarging or reducing image data of a relevant document according to a predetermined paper size and the number of combination, and a similarity value used as a threshold value for determining approval or disapproval of disposal of the paper document; a document disposal approval/disapproval determination request unit which separates and extracts the combined image data and the pairs of document identification information and combination identification information from the image output obtained by scanning the paper document to be disposed of, and requests the document management device for document disposal approval/disapproval determination by using an arbitrary number of the extracted pieces of combined image data and an arbitrary number of the extracted pairs of document identification information and combination identification information; a determination unit which receives a document disposal approval/disapproval determination request containing an arbitrary number of pieces of combined image data and pairs of document identification information and combination identification information, compares each of the pieces of the combined image data with the comparison image data by using each of the document identification information as a key to compute a similarity value, and determines whether disposal of the document is to be approved or not according to whether all of the computed similarity values exceed the threshold value and the number of pieces of the combined image data satisfies the number of combined documents indicated by the combination identification information; and a document disposal approval/disapproval controller which performs document disposal approval/disapproval control to dispose of or prohibit disposal the paper document based on the determination result made by the determination unit in response to the document disposal approval/disapproval determination request. However, the document disposal management program may be provided by being stored in a recording medium such as a CD-ROM.

The present invention is applicable to a multifunctional device or printer having a multiple-page combined printing function such as N-up printing, a document disposal management system and document disposal management device including a shredder, and a document disposal management program, which are capable of controlling approval and disapproval of disposal of a derived document derived by multiple-page combined printing based on a result of tracing its source documents.

The foregoing description of the exemplary embodiment of the present invention is provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document disposal management system comprising:
an image formation device;
a document management device; and
a document disposal device, wherein:
the image formation device comprises:
a print unit that performs combined printing of a plurality of documents as a paper document in which pieces of combined image data of the documents enlarged or reduced according to a designated paper size and the number of combination are arranged respectively to N-divided regions where each of the regions is indicated by combination identification information of n/N (n is an integer of one or greater), and each of the plurality of the documents is embedded with document identification information and the combination identification information;
the document management device comprises:
a management unit that manages, in association with the document identification information, comparison image data obtained by enlarging or reducing image data of a relevant document according to a prescribed paper size and the number of combination, and a similarity value used as a threshold value for determining approval or disapproval of disposal of a paper document; and
a determination unit that receives from the document disposal device a document disposal approval/disapproval determination request containing an arbitrary number of pieces of combined image data and pairs of document identification information and combination identification information, compares each of the pieces of the combined image data with the comparison image data by using each of the document identification information as a key to calculate a similarity value, and determines whether disposal of the document is to be approved or not according to whether all of the calculated similarity values exceed the relevant threshold value and the number of pieces of the combined image data satisfies the number of combination indicated by the combination identification information; and
the document disposal device comprises:
a document disposal approval/disapproval determination request unit that separates and extracts the combined image data and the pairs of document identification information and combination identification information from the image output obtained by scanning the paper document to be disposed of and requests the document management device for document disposal approval/disapproval determination by using an arbitrary number of pieces of the extracted combined image data and an arbitrary number of the extracted pairs of document identification information and combination identification information; and
a document disposal approval/disapproval controller that performs document disposal approval/disapproval control to dispose of or prohibit disposal of the paper document to be disposed of based on the determination result made by the determination unit in response to the document disposal approval/disapproval determination request.

2. The document disposal management system according to claim 1, wherein:
the print unit performs duplex printing of designated documents on both sides of a paper document while embedding the document identification information and the combination identification information in image data of the corresponding document on each side of the paper document;
the document disposal approval/disapproval determination request unit scans the both sides of the paper document to extract the image data and the pair of the document identification information and combination identification information from each side of the paper document, and makes the document disposal approval/disapproval determination request by using the extracted image data and the pairs of document identification information and combination identification information.

3. The document disposal management system according to claim 1, wherein:
the image formation device further comprises a notification unit that, when the combined printing is performed, notifies the document management device of a paper size, the number of combined documents, and document identification information of each of the documents to be combined; and
the document management device further comprises a comparison image data generation unit that generates the comparison image data by enlarging or reducing the image data managed in association with each of the document identification information notified by the notification unit based on the paper size and the number of combined documents notified by the notification unit.

4. The document disposal management system according to claim 2, wherein:
the image formation device further comprises a notification unit that, when the combined printing is performed, notifies the document management device of a paper size, the number of combined documents, and document identification information of each of the documents to be combined; and
the document management device further comprises a comparison image data generation unit that generates the comparison image data by enlarging or reducing the image data managed in association with each of the document identification information notified by the notification unit based on the paper size and the number of combined documents notified by the notification unit.

5. The document disposal management system according to claim 1, further comprising an information processing terminal communicably connected to the document disposal management system, wherein:
the information processing terminal comprises:

an information generation unit that generates document identification information and image data of an electronic document to be registered in the document management device;

a designation unit that designates a similarity value to be set as the threshold value in association with the image data generated by the information generation unit; and a registration request unit that requests registration of the electronic document, the document identification information, the image data, and the similarity value; and the management unit registers and manages the electronic document, the document identification information, the image data, and the similarity value in association with the document identification information based on the registration request made by the registration request unit.

6. The document disposal management system according claim 2, further comprising an information processing terminal communicably connected to the document disposal management system, wherein:

the information processing terminal comprises:

an information generation unit that generates document identification information and image data of an electronic document to be registered in the document management device;

a designation unit that designates a similarity value to be set as the threshold value in association with the image data generated by the information generation unit; and a registration request unit that requests registration of the electronic document, the document identification information, the image data, and the similarity value; and the management unit registers and manages the electronic document, the document identification information, the image data, and the similarity value in association with the document identification information based on the registration request made by the registration request unit.

7. The document disposal management system according to claim 3, further comprising an information processing terminal communicably connected to the document disposal management system, wherein:

the information processing terminal comprises:

an information generation unit that generates document identification information and image data of an electronic document to be registered in the document management device;

a designation unit that designates a similarity value to be set as the threshold value in association with the image data generated by the information generation unit; and a registration request unit that requests registration of the electronic document, the document identification information, the image data, and the similarity value; and the management unit registers and manages the electronic document, the document identification information, the image data, and the similarity value in association with the document identification information based on the registration request made by the registration request unit.

8. The document disposal management system according to claim 4, further comprising an information processing terminal communicably connected to the document disposal management system, wherein:

the information processing terminal comprises:

an information generation unit that generates document identification information and image data of an electronic document to be registered in the document management device;

a designation unit that designates a similarity value to be set as the threshold value in association with the image data generated by the information generation unit; and a registration request unit that requests registration of the electronic document, the document identification information, the image data, and the similarity value; and the management unit registers and manages the electronic document, the document identification information, the image data, and the similarity value in association with the document identification information based on the registration request made by the registration request unit.

9. A document disposal management device comprising:

a print unit that performs combined printing of a plurality of documents as a paper document in which pieces of combined image data of the documents enlarged or reduced according to a designated paper size and the number of combination are arranged respectively to N-divided regions where each of the regions is indicated by combination identification information of n/N (n is an integer of one or greater), and each of the plurality of the documents is embedded with document identification information and the combination identification information;

a management unit that manages, in association with the document identification information, comparison image data obtained by enlarging or reducing image data of a relevant document according to a prescribed paper size and the number of combination, and a similarity value used as a threshold value for determining approval or disapproval of disposal of the paper document;

a document disposal approval/disapproval determination request unit that separates and extracts the combined image data and the pairs of document identification information and combination identification information from the image output obtained by scanning the paper document to be disposed of and requests the document management device for document disposal approval/disapproval determination by using an arbitrary number of pieces of the extracted combined image data and an arbitrary number of the extracted pairs of document identification information and combination identification information;

a determination unit that receives a document disposal approval/disapproval determination request containing an arbitrary number of pieces of combined image data and pairs of document identification information and combination identification information, compares each of the pieces of the combined image data with the comparison image data by using each of the document identification information as a key to calculate a similarity value, and determines whether disposal of the document is to be approved or not according to whether all of the calculated similarity values exceed the relevant threshold value and the number of pieces of the combined image data satisfies the number of combination indicated by the combination identification information; and a document disposal approval/disapproval controller that performs document disposal approval/disapproval control to dispose of or prohibit disposal of the paper document to be disposed of based on the determination result made by the determination unit in response to the document disposal approval/disapproval determination request.

10. A document disposal management method, comprising:

performing combined printing of a plurality of documents as a paper document in which pieces of combined image data of the documents enlarged or reduced according to a designated paper size and the number of combination are arranged respectively to N-divided regions where each of the regions is indicated by combination identification information of n/N (n is an integer of one or greater), and each of the plurality of the documents is embedded with document identification information and the combination identification information;

managing, in association with the document identification information, comparison image data obtained by enlarging or reducing image data of a relevant document according to a prescribed paper size and the number of combination, and a similarity value used as a threshold value for determining approval or disapproval of disposal of a paper document;

receiving a document disposal approval/disapproval determination request containing an arbitrary number of pieces of combined image data and pairs of document identification information and combination identification information, comparing each of the pieces of the combined image data with the comparison image data by using each of the document identification information as a key to calculate a similarity value, and determining whether disposal of the document is to be approved or not according to whether all of the calculated similarity values exceed the relevant threshold value and the number of pieces of the combined image data satisfies the number of combination indicated by the combination identification information;

separating and extracting the combined image data and the pairs of document identification information and combination identification information from the image output obtained by scanning the paper document to be disposed of, and requesting for document disposal approval/disapproval determination by using an arbitrary number of pieces of the extracted combined image data and an arbitrary number of the extracted pairs of document identification information and combination identification information; and performing document disposal approval/disapproval control to dispose of or prohibit disposal of the paper document to be disposed of based on the determination result in response to the document disposal approval/disapproval determination request.

11. A non-transitory computer readable recording medium storing a document disposal management program that causes a computer to execute a process of document disposal management, the process comprising:

performing combined printing of a plurality of documents as a paper document in which pieces of combined image data of the documents enlarged or reduced according to a designated paper size and the number of combination are arranged respectively to N-divided regions where each of the regions is indicated by combination identification information of n/N (n is an integer of one or greater), and each of the plurality of the documents is embedded with document identification information and the combination identification information;

managing, in association with the document identification information, comparison image data obtained by enlarging or reducing image data of a relevant document according to a prescribed paper size and the number of combination, and a similarity value used as a threshold value for determining approval or disapproval of disposal of a paper document;

receiving a document disposal approval/disapproval determination request containing an arbitrary number of pieces of combined image data and pairs of document identification information and combination identification information, comparing each of the pieces of the combined image data with the comparison image data by using each of the document identification information as a key to calculate a similarity value, and determining whether disposal of the document is to be approved or not according to whether all of the calculated similarity values exceed the relevant threshold value and the number of pieces of the combined image data satisfies the number of combination indicated by the combination identification information;

separating and extracting the combined image data and the pairs of document identification information and combination identification information from the image output obtained by scanning the paper document to be disposed of, and requesting for document disposal approval/disapproval determination by using an arbitrary number of pieces of the extracted combined image data and an arbitrary number of the extracted pairs of document identification information and combination identification information; and performing document disposal approval/disapproval control to dispose of or prohibit disposal of the paper document to be disposed of based on the determination result in response to the document disposal approval/disapproval determination request.

* * * * *